(12) United States Patent
Lansbergen et al.

(10) Patent No.: US 10,167,365 B2
(45) Date of Patent: *Jan. 1, 2019

(54) POLYMER AND COMPOSITION

(71) Applicant: DSM IP ASSETS B.V., Heerlen (NL)

(72) Inventors: Adrianus Jozephus Hendricus Lansbergen, Echt (NL); Cornelis Eme Koning, Echt (NL); Paulus Franciscus Anna Buijsen, Echt (NL); Johannes Wilhelmus Maria Hendriks, Echt (NL); Alwin Papegaaij, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 27 days.

This patent is subject to a terminal disclaimer.

(21) Appl. No.: 15/025,624

(22) PCT Filed: Oct. 13, 2014

(86) PCT No.: PCT/EP2014/071879
§ 371 (c)(1),
(2) Date: Mar. 29, 2016

(87) PCT Pub. No.: WO2015/052342
PCT Pub. Date: Apr. 16, 2015

(65) Prior Publication Data
US 2016/0237213 A1 Aug. 18, 2016

(30) Foreign Application Priority Data
Oct. 11, 2013 (EP) ..................................... 13188226

(51) Int. Cl.
*C08G 63/685* (2006.01)
*C08G 73/16* (2006.01)
(Continued)

(52) U.S. Cl.
CPC ......... *C08G 73/16* (2013.01); *C08G 63/6856* (2013.01); *C08G 63/6858* (2013.01); *C08L 79/08* (2013.01); *C09D 5/022* (2013.01); *C09D 167/08* (2013.01); *C09D 179/08* (2013.01)

(58) Field of Classification Search
CPC .. C08G 73/16; C08G 63/6856; C08G 179/08; C08G 167/08; C08G 79/08; C08G 5/022
USPC ........................................................ 524/607
See application file for complete search history.

(56) References Cited

U.S. PATENT DOCUMENTS 2,695,905 A * 11/1954 Eilar .................. C07D 207/416
516/15
3,238,181 A * 3/1966 Anderson .............. C08G 69/44
525/421

(Continued)

FOREIGN PATENT DOCUMENTS

EP 0 013 397 12/1979
EP 0 013 397 7/1980
(Continued)

OTHER PUBLICATIONS

Machine translation EP 0013397 A1, to Bederke et al. published Jul. 1980 (Year: 1980).*

(Continued)

*Primary Examiner* — Jane L Stanley
(74) *Attorney, Agent, or Firm* — Nixon & Vanderhye P.C.

(57) ABSTRACT

The present invention relates to a polyester resin obtained by reaction in a process (I) between the following components A to E to obtain a polyester P (the polyester comprising an alkyd resin and/or a saturated polyester resin), where (A) Component A (also referred to herein as the Imide and/or Imide Component) comprises one or more cyclic imides of Formula (1); where R' represents a divalent optionally substituted saturated $C_{1-30}$ organo moiety; and R represents H or a monovalent optionally substituted saturated $C_{1-30}$ organo moiety; (A') Optional Component A' comprises saturated dicarboxylic acid and/or saturated hydroxyacid and that is not optional in case component A does not comprise a dicarboxylic acid or a hydroxyacid; 1(B) Component B (also referred to herein as the Polyol and/or Polyol Component) comprises at least one saturated polyhydric alcohol; (C) Optional Component C (also referred to herein as the Rosin and/or Rosin Component) comprises naturally occurring rosin, the rosin comprising from 40 to 80 parts per hundred by weight of rosin of an unsaturated mono carboxylic acid comprising at least one $C_{5-25}$ cyclohydrocarbo moiety capable of undergoing a Diels Alder or Ene reaction; (D) Optional Component D (also referred to herein as the Fatty Acid and/or Fatty Acid Component) comprises at least one linear $C_{2-60}$ hydrocarbo carboxylic acid optionally comprising at least two linoleically unsaturated double bonds; 2(E) Optional Component E (also referred to as the Other Component E) which may comprise at least one monofunctional or polyfunctional monomer other than any of Components A to D.

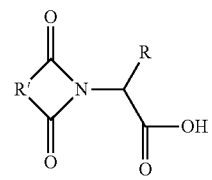

(1)

25 Claims, No Drawings

(51) Int. Cl.
*C09D 167/08* (2006.01)
*C08L 79/08* (2006.01)
*C09D 5/02* (2006.01)
*C09D 179/08* (2006.01)

(56) References Cited

U.S. PATENT DOCUMENTS

| | | | | | |
|---|---|---|---|---|---|
| 4,137,221 | A | * | 1/1979 | Hara | C08G 73/16 521/48 |
| 4,237,022 | A | * | 12/1980 | Barrer | C07D 207/416 252/392 |
| 4,436,918 | A | * | 3/1984 | Horii | C07D 207/40 260/1 |
| 4,446,038 | A | * | 5/1984 | Schlicht | C10M 133/16 508/290 |
| 4,512,903 | A | * | 4/1985 | Schlicht | C10L 1/224 508/555 |
| 4,663,424 | A | * | 5/1987 | Stix | C08G 63/64 522/104 |
| 4,822,886 | A | * | 4/1989 | Donovan | C07D 207/46 546/243 |
| 4,861,861 | A | * | 8/1989 | Gabutti | C08G 59/4276 528/272 |
| 2004/0063852 | A1 | * | 4/2004 | Wamprecht | C08G 18/4646 524/589 |
| 2005/0119134 | A1 | * | 6/2005 | Tequi | C10M 161/00 508/155 |
| 2005/0171326 | A1 | * | 8/2005 | Edwards | C08G 63/183 528/272 |

FOREIGN PATENT DOCUMENTS

EP    0 183 143    6/1986
WO    2009/085898  7/2009

OTHER PUBLICATIONS

International Search Report for PCT/EP2014/071879 dated Jan. 14, 2015, 3 pages.

* cited by examiner

POLYMER AND COMPOSITION

This application is the U.S. national phase of International Application No. PCT/EP2014/071879 filed 13 Oct. 2014 which designated the U.S. and claims priority to EP Patent Application No. 13188226.8 filed 11 Oct. 2013, the entire contents of each of which are hereby incorporated by reference.

The present invention relates to the field of resins for coating compositions such as paints that comprise polyester resins. The polyester resins may be autoxidisable (for example alkyds comprising autoxidisable unsaturated fatty acid moieties), may be non-autoxidisable (for example polyesters that do not comprise autoxidisable groups) and/or may be mixtures of both types. The invention also relates to methods for making and using such resins and compositions containing them.

Paints (such as alkyd paints) for professional and do-it-yourself applications are subject to increasing technical and ecological restrictions. Emissions of volatile organic compounds (VOC) must be reduced to protect the environment. Polyester resins with a high content of solids and/or which are water borne (such as alkyd resins) have been used to address the problem of VOC. It is also desirable that paints are obtained from sustainable sources. It is therefore preferred object of the invention that the resins have a high biorenewable content as defined herein. As used herein alkyd resin denotes a polyester comprising one or more unsaturated fatty acid moieties which are auto-oxidisable in air under standard conditions.

Prior art alkyd resins are typically obtained from a polycondensation of fatty acids or vegetable oils (30 to 70% by weight), polyols such as glycerol or pentaerythritol (10 to 40% by weight) and polyacids such as phthalic anhydride (10 to 40% by weight). These known alkyd resins have a broad molecular weight distribution and a branched structure, contain residual hydroxyl and carboxyl groups for wetting properties and are capable of autoxidative drying. Due to auto-oxidisation, alkyd resins discolour in the dark and turn yellow. This tendency is even more pronounced for renewable alkyds that contain rosin and a high proportion of fatty acid. It is therefore desirable to find alkyds having improved properties.

An imide is a functional group consisting of two acyl groups bound to nitrogen. Although the class of poly(ester-imide) polymers has been known for 35 years, few real examples of imide-modified polyester and/or alkyd resins exist and imide functional groups have not been widely used as building blocks in commercially available polyester resins and have not been used to prepare paints as it is believed that imides would not provide sufficiently good coating performance for decorative applications. This is confirmed in a review of the prior art of poly(ester-imide)s in a 1999 article by Lienert entitled 'Poly(ester-imide)s for Industrial Use' (Adv. Poly. Sci., Vol. 141, 1999, pages 45-82) as the poly(ester-imide)s that are described in this paper are not suitable for use in paints. Lienert is generally concerned with improving the thermal properties of the widely used alkyd varnishes previously used to impregnate magnet wire coils of electrical motors. Such conventional varnishes comprise air drying alkyds and alkyds or polyester resins which are crosslinked during curing by melamine, phenolic, or isocyanate resins. Lienert describes an impregnating varnish having improved thermal properties prepared from a linseed oil alkyd, modified with tris-(2-hydroxyethyl)-isocyanurate (also referred to herein as THEIC or THIC), diimidodicarboxylic acid (DID acid) and dissolved in a xylene-cyclohexane mixture. Other THEIC and DID acid-modified alkyds, containing tall oil fatty acid and being formulated with a phenolic resin are stated to resist temperatures higher than 180° C. Polyurethane varnishes, where the polyester is DID acid-modified, are stated to have good flexibility and thermal resistance.

The term 'imide' as used hereinafter refers to a compound that comprises a moiety of the structure R'(C=O)NR"(C=O)R''' where each R', R" and/or R''' together with the moiety to which they are both attached may form an optional substituted saturated $C_{3-60}$ organo cyclic group and/or each R' R" and/or R''' may be H and/or independent of each other, in each case also being an optional substituted saturated $C_{1-60}$organo group, preferably a saturated $C_{1-30}$hydrocarbo, more preferably optionally substituted saturated $C_{1-20}$hydrocarbyl (for example saturated $C_{1-10}$alkyl or optionally substituted saturated $C_{3-10}$(alk)aryl (for example optionally substituted phenyl) and/or the bivalent equivalents thereof.

Further known polyester imides are described below.

CN101328267 (University of Shaoxing) describes a biodegradable poly(citric amide imide) prepared by evenly mixing citrate ester and aliphatic diamine in a respective mole ratio of 0.2 to 5, with 1 to 10% of a catalyst by weight of citrate ester. The mixture is heated to a temperature of 50 to 100° C. for 1 to 6 hours under reduced pressure to undergo condensation polymerization to form a prepolymer. The prepolymer is then further heated at a temperature of 50 to 160° C. for 10 to 24 hours to produce a crosslinked network of biodegradable poly(citric amide imide). This document does not describe use of citric imides to prepare polyester or alkyd resins for use in paints.

WO9702307 (Preform GmbH) describes a polymer obtained from reacting renewable raw materials that comprise 10 to 90% by mass of a triglyceride with at least 2 epoxy and/or aziridine groups, 5 to 90% by mass of a polycarboxylic acid anhydride and 0.01 to 20% by mass of a polycarboxylic acid.

High solid renewable resins with a low amount of volatile organic compounds (low VOC) are described in the applicant's patent application EP2121802 (=WO 2008-101722). The application describes a solvent-borne product obtained by reacting tung oil with acids such as maleic anhydride or itaconic acid via a Diels-Alder reaction to form an adduct which is then further reacted with an alcohol such as glycerol to form an alkyd of medium to high molecular weight and very long oil length (≥80).

FR1477698 (Alsthom) describes an impregnation resin for use with electric motors, the resin comprising an alternating series of trimellitic diimide units and hydroxy terephthalic polyester units. The trimellitic diimide units are obtained from condensation of trimellitic anhydride and an aromatic diisocyanate. The hydroxy terephthalic polyester units are obtained from trans-esterification of a mixture of dimethylterephthalate and adipic acid and a mixture of neopentylglycol (NPG) and trimethylolpropane (TMP). Use of the specific imides or acids used in the present invention is not described in this document.

GB904559 (ICI) describes a polyamide-imide resin made from a conjugated unsaturated fatty acid, an unsaturated polycarboxylic acid cyclic anhydride and a diamine preferably by reacting the diamine with a pre-formed Diels Alder adduct of the acid and the cyclic anhydride. These polyamide-imide resins may be blended with urea-formaldehyde, melamine-formaldehyde, phenol-formaldehyde, alkyd or epoxy resins or nitrocellulose and are soluble in xylol-butanol mixtures. Use of specific imides or acids used in the present invention is not disclosed in this reference.

GB1099108 (Mobil) describes polyester-imide copolymers prepared from (A) at least one dicarboxylic acid diimide, (B) at least one aliphatic or cycloaliphatic $C_{2-10}$ diol, and (C) at least one tri-hydroxyalkyl isocyanurate, where the copolyester has a specific viscosity of 0.1-0.7. The relative weight proportions of (A), (B) and (C) are defined graphically but preferably correspond to (A)=25-56% (6)=6-46% and (C)=13-54%. The dicarboxylic acid diimide may be obtained by reacting 2 moles of a tricarboxylic acid with 1 mole of a diamine, e.g. trimellitic anhydride with e.g. methylene dianiline, p-diaminobenzene or ethylene diamine or by reacting 2 moles of an aminocarboxylic acid with 1 mole of a tetracarboxylic acid, e.g. glycine, anthranilic acid or aminosalicylic acid with benzophenone tetracarboxylic acid. These copolyesters may be mixed with an alkyl-phenol modified, organic solvent-soluble, thermosetting aminoplast resin (2-25%) and a titanium catalyst (≤0.1%) (all % by weight of copolyester) to form a composition applied as a base coat to copper wire. The examples of Mobil describe resins prepared from a trimellitic anhydride/methylene dianiline dicarboxylic acid diimide, ethylene glycol and tris hydroxyethyl isocyanurate, which are then mixed with an alkyl phenol modified butylated melamine-formaldehyde resin and titanium cresylate in cresylic acid/xylol/aromatic hydrocarbon solvent. There is no suggestion from this document that the specific imides described herein could be used to prepare polyester resins for use in paints.

JP 53-018695 (Mitsubishi Electric) describes heat resistant alkyd resins prepared by introducing imide rings into the resin macromolecules with a series of continuous reactions without using solvents. The resultant resins are used to insulate motors as they have excellent film properties and thermal stability and are not used as binder resins for coatings.

JP2010-280833 (Pilot Ink) describes an oily ink composition that comprises a pigment, an organic solvent (an aliphatic hydrocarbon, an alicyclic hydrocarbon or an aromatic hydrocarbon), a resin and from 0.3 to 10% of succinimide by weight of the total amount of the ink. The ink is used in a marking pen and has excellent pigment dispersibility (i.e. there is little aggregation or precipitation of the pigment after aging) so the pen can write well over an extended period of time. There is no suggestion from this document that succinimides could be used to produce polyester or alkyd coating resins.

JP7309821 (New Japan Chem. Co.) describes trivalent or tetravalent aliphatic polycarboxylic acid amides of Formula I [A-(CO—X)$_n$] where A is an aliphatic saturated $C_{3-10}$ carboxylic acid residue; X is NR$^1$R$^2$ (where R$^1$ and R$^2$ are each H, an alkyl, a halogenoalkyl, an alkenyl, a cycloalkyl, a cycloalkenyl, an aryl or an aralkyl); and 'n' is 3 or 4. An example of a compound of Formula 1 is 1,2,3-propanetricarboxylic acid tricyclohexylamide. Acid amides of Formula I are obtained by heating an aliphatic polycarboxylic acid ester of Formula II [A-(COOR$^3$)$_n$] where R$^3$ is C$_{1-4}$alkyl) and an amine of formula III [X—H] without using a catalyst or in the presence of an acid catalyst to carry out an ester-amide interchange reaction. The acid amides of Formula 1 are stated to be useful as antioxidants, ultraviolet absorbents, antibacterial agents, mildew-proofing agents, nucleating agents and/or additive to polymers. The process is stated to easily and efficiently produce the acid amides of Formula I on an industrial scale, at a low cost in high yield and purity. This document does not teach use of these acid amides to prepare polyesters or alkyd resins for coating compositions.

U.S. Pat. No. 3,945,959 (P D George Co) describes oil-modified imidized polyester resins that contain isocyanurates of formula

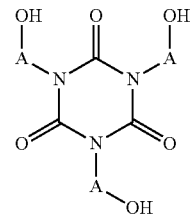

where A is alkylene, preferably ethylene (i.e. the formula then represents tris-(2-hydroxyethyl)-isocyanurate [THIC]). These imidized resins are used to prepare electrically insulating varnishes. The unmodified THIC resins are described in U.S. Pat. No. 3,312,645. U.S. Pat. No. 4,375,528 also describes water soluble and/or dispersible compositions comprising oil-modified imidized polyesters (such as those described in U.S. Pat. No. 3,945,959).

U.S. Pat. No. 4,267,232 (Beck) describes polyester imide resins used (when dissolved in cresol) as enameling lacquers for wire conductors. The resins are made from imide group starting materials that are prepared by reacting an acid component (a) with an amine component (b).

Acid component (a) is described as aromatic carboxylic acid anhydrides with a 5-membered cyclic carboxylic acid anhydride group and at least one additional reactable group, and is preferably trimellitic acid anhydride (=1,2,4-benzenetricarboxylic acid, cyclic 1,2-anhydride or

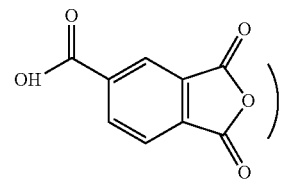 [SMILES: O=C(O)c1ccc2c(c1)C(=O)OC2=O]

or a tetracarboxylic acid di-anhydride such as pyromellitic acid anhydride (=1,2,4,5-benzenetetracarboxylic anhydride or

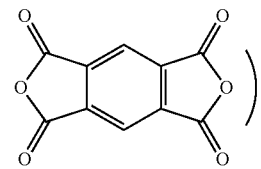 [SMILES: O=c1oc(=O)c2cc3c(=O)oc(=O)c3cc12]

Amine component (b) is described as a primary amine with at least one additional reactable group such as carboxy, hydroxy or an additional primary amino group which preferably is a diprimary diamine or an amino alcohol. Beck does not disclose use of specific imides prepared from specific acids and amines described herein and the desired end use of the polyester imides described in Beck would teach a reader away from using such imides to prepare them.

U.S. Pat. No. 4,446,038 (Texaco) describes lubricants that comprise citric imide acids represented by formula:

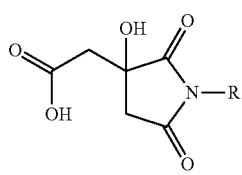

wherein R is a $C_{5-30}$ hydrocarbo radical. Mobil teaches that these unreacted citric imide acids are useful as friction reducing agents in motor oils and other lubricants. This teaches a reader away from the using such citric imide acids or similar imides in a very different manner as reagents in a polycondensation to obtain polyesters or alkyds suitable for decorative coating compositions.

U.S. Pat. No. 5,310,856 (Industrial Technology Research Institute) describes highly transparent and heat resistant polyester imides prepared from hydroxyl aromatic imides for use in printed circuit boards (PCB).

US2006-194922 (Cytec) describes hydroxyl-functional binders comprising a linear or branched main chain having a polymethylene structure —$(CH_2)_n$— or a polyester structure or a structure derived from the fatty acid esters of glycerin or other polyvalent alcohols where the binder has cyclic imide structures grafted onto the main chain, and the imide-nitrogen atom is substituted by a hydroxyalkyl group or a hydroxyalkyl-aryl group. These binders can be prepared by reacting ethylenically unsaturated acid anhydrides and hydroxyamines. Although Cytec does describe coating resins with alkyd imides these alkyd imides are prepared from amino alcohols and not from amino acids and neither citric acid nor succinic acid is used as building blocks.

US2011-223364 (Hawkins et al) describes insulating materials that use bio-based binders that include a carbohydrate and a cross-linking agent. The cross-linking agent may optionally be citric acid. Hawkins addresses the problem of providing binders to prepare formaldehyde-free fibrous insulators and non-woven mats. This is very different from the problem of the present invention which is directed towards problems such as providing improved coating compositions for decorative applications e.g. improved paints.

EP 13397 (Herberts) describes poly(ester-imide)s made from maleic anhydride fatty acids and p-amino benzoic acid.

DE3443090 (Bayer) describes poly(ester-imide)s made from dimethylmaleic anhydride and glycine.

DE2460768 (Beck & Co) describes poly(ester-imide)s for use as electric insulators, the imides being prepared from tetrahydrophthalic anhydride (THPA) and amino alcohols or amino acids.

Angew. Makromol. Chem. 55, 14, (1976), 73 describes poly(ester-imide)s made from trimellitic acid anhydride (TMA) and a,ω-aminoacid (glycine)

WO2008-134308 (Valspar) describes crosslinkable hydroxyl-functional imide polyester resins as binders for coil coatings to protect metal substrates. The imide polyester resins have an OH number from 90 to 215 mg/g KOH if used as primer coat and from 100 to 215 mg/g KOH if used as top coat and are prepared from a symmetric heterocyclic imide triol and a (di)acid producing derivative thereof together with a blocked polyisocyanate cross-linker. Preferred imides are made from THIC (trishydroxyethylisocyanurate).

Thus it can be seen that imides have rarely been used to prepare polyester resins and where used those imides are generally aromatic imides (prepared from compounds such as trimellitic anhydride) for use in electrically insulating varnishes. Poly(ester-imide)s or alkyd imides have generally not been used as binder resins to prepare coating compositions suitable for decorative applications such as paint. Poly(ester-imide)s have also not previously been prepared using imides derived from simple components optionally obtained from bio-renewable sources as it was believed that such imides would not provide sufficiently good coating performance.

Surprisingly the applicant has discovered that polyester resins such as alkyd resins having useful coating properties may be prepared from simple (preferably aliphatic and/or bio-renewable) imide-functional building blocks especially from amino acid-, citric acid- and/or succinic acid-derived imide building blocks. These building blocks may be obtained from bio-renewable sources and yet unexpectedly the resultant emulsions also exhibit improved and/or comparable properties to prior art polyester resins. For example optionally the resin compositions of the invention may exhibit improved tackiness performance, lower yellowing and/or may be obtained using a high proportion of ingredients available from renewable sources compared to prior art polyester resins.

It is an object of the present invention to solve some or all of the problems described herein.

The applicant has also found in one embodiment of the invention that certain acid-functional cyclic imides, that may be formed by reaction of certain simple polycarboxylic acids with amino acids (carboxy functional amines), may then be used as a reagent in a polycondensation reaction (for example by reacting with polyols) as building blocks to prepare polyesters (e.g. alkyd resins). Such polyesters are especially useful in decorative coatings such as paints and may be obtained from renewable sources.

Without wishing to be bound by any theory it is believed that certain (optionally bio-renewable) acids may react with certain amino acids according to the following general reaction scheme to form a mono, di- or tri-acid functional cyclic imide for use as a polyester building block. Thus for example an amino acid represented by structure

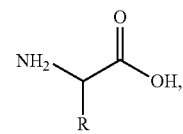

[A]

where R represents H or any suitable organo group (described below), may react with poly acids (e.g. the di or tri acids) such as those specified herein to give (after eliminating water) a cyclic imide of structure Formula I:

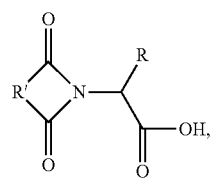

Formula I where R' represents a divalent optionally substituted saturated $C_{1-30}$ organo moiety; and R represents H or a monovalent optionally substituted saturated $C_{1-30}$ organo moiety. Thus in part of Formula I, R' together with the —(C=O)N—(C=O)— moiety to which it is attached represent a cyclic imide moiety.

As used herein, a saturated polyester resin does not have carbon-carbon unsaturations (carbon-carbon double bonds or carbon-carbon triple bonds) that are radically reactive in the radical polymerisation of the polyester resin. For the purpose of clarity, the saturated polyester may contain aromatic rings because the carbon-carbon double bonds of such aromatic rings do not radically react in the radical polymerization of the polyester.

As used herein, a saturated compound (such as a saturated moiety or saturated monomer) is a compound that does not contain carbon-carbon unsaturations (carbon-carbon double bonds or carbon-carbon triple bonds) that are radically reactive in the radical polymerisation of the polyester resin, but it may contain aromatic rings.

Preferably R' is a divalent optionally substituted saturated $C_{1-20}$ hydrocarbo, more preferably is optionally substituted saturated $C_{1-10}$ hydrocarbo, most preferably is saturated $C_{1-6}$ hydrocarbylene optionally substituted by one or more amino, carboxy and/or hydroxy for example $C_{1-4}$ alkylene optionally substituted by carboxy and/or hydroxy. Conveniently R' is an aliphatic (non-aromatic) saturated moiety.

Preferably R is an optionally substituted saturated $C_{1-20}$ hydrocarbo (for example optionally substituted with one or more nitrogen, sulfur, oxygen, phosphorus and/or selenium containing moiety) even more preferably is optionally substituted saturated $C_{1-10}$ hydrocarbo, most preferably is saturated $C_{1-6}$ hydrocarbyl optionally substituted by one or more amino, phenyl, carboxy and/or hydroxy for example $C_{1-4}$ alkyl optionally substituted by amino and/or phenyl. Conveniently if R comprises an aromatic moiety R is obtained from a bio-renewable source, for example in amino acid [A] when R is a benzyl (PhCh2-) group the amino acid [A] is the naturally occurring phenylalanine.

Thus (without wishing to be bound by any mechanism) the following specific embodiments of processes for preparing imides useful in the present invention may be envisaged.

Reacting 1 mole of citric acid

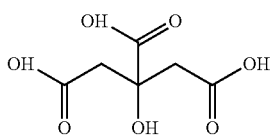 [SMILES: O=C(O)CC(O)(CC(=O)O)C(=O)O]

plus 1 mole amino acid [A] to give 2 moles of $H_2O$ plus 1 mole of a diacid-functional cyclic imide (or triacid-functional in the cases of glutamine, aspartic acid and glutamic acid) of structure C

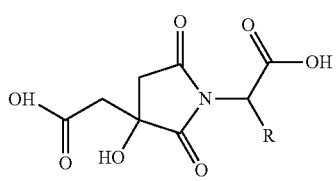

Formula 2

(also denoted citric imide derivative).

Similarly reacting 1 mole of succinic acid

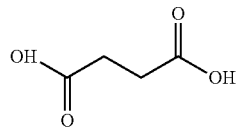

plus 1 mole carboxy amine [A] may give 2 moles $H_2O$ plus 1 mole of a mono acid functional cyclic imide (or diacid-functional in the cases of aspartic acid and glutamic acid) of structure

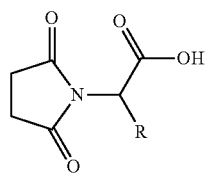

Formula 3

(also denoted succinimide derivative)

In Formulae 2 and/or 3 R preferably denotes an optionally substituted saturated hydrocarbo moiety obtained from for example amino acids. The Formulae 2, 3 and/or R may thus also contain oxygen, nitrogen, phosphorus, selenium and/or sulfur atoms in addition to carbon and hydrogen (for example if the amino acid is cysteine R may comprise sulphur and if the amino acid is lysine R may comprise nitrogen). Both Formulae 2 and/or 3 may also represent imidized amines e.g. derived and/or derivable from lysine, succinic acids, citric acid and/or other tricarboxylic acids and derivatives, e.g. anhydrides thereof. Succinic or other anhydrides can also be reacted with the amino acid in which case one mole of $H_2O$ is formed, although succinic acid is preferably since this readily available from biorenewable sources.

Preferred amino acids suitable for use in the above reaction schemes comprise:

glycine (i.e. $NH_2CH_2COOH$); or

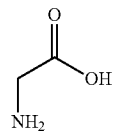

lysine (i.e. $HO_2CCH(NH_2)(CH_2)_4NH_2$); or

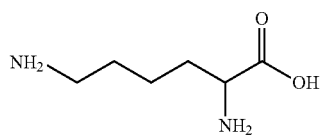

alanine (i.e. $CH_3CH(NH_2)COOH$; or

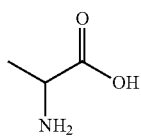

phenylalanine (i.e. $C_6H_5CH_2CH(NH_2)COOH$; or

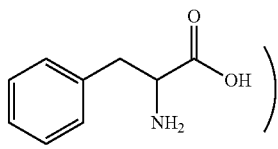 [SMILES: NC(Cc1ccccc1)C(=O)O]

beta-alanine, glutamic acid, threonine, tryptophan, valine, leucine, isoleucine, histidine and/or those amino acids that may be obtainable by fermentation (such as glutamate).

Thus more preferred diacid and/or triacid functional imides useful in the present invention that may for example be obtained from citric acid may comprise one or more imides having the following structures:

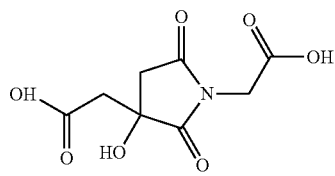 [SMILES: O=C(O)CN1C(=O)CC(O)(CC(=O)O)C1=O]

(also denoted I1 or Imide 1),

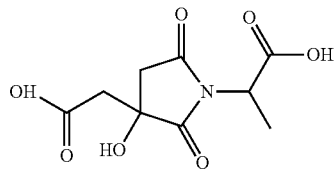 [SMILES: CC(C(=O)O)N1C(=O)CC(O)(CC(=O)O)C1=O]

(also denoted I2 or Imide 2).

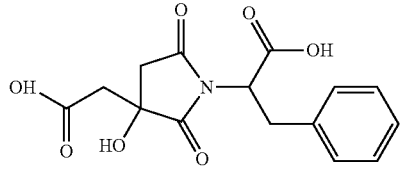 [SMILES: O=C(O)CC1(O)CC(=O)N(C(Cc2ccccc2)C(=O)O)C1=O]

(also denoted I3 or Imide 3).

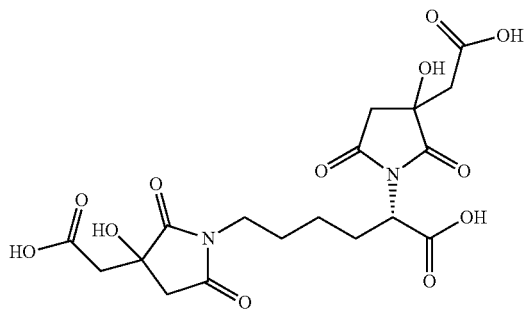 [SMILES: O=C(O)CC1(O)CC(=O)N(CCCC[C@@H](C(=O)O)N2C(=O)CC(O)(CC(=O)O)C2=O)C1=O]

(also denoted I4 or Imide 4)

Without being bound by any mechanism it is believed that imides above are non-exhaustive list of possible structures obtained. Thus multifunctional amines where the reaction site is sterically unhindered (such as those that may be used to prepare Imide 4) may react first in preference to those amines that are sterically hindered to form an imide. Both types of amine (sterically hindered and sterically unhindered) may also react as described herein to form a trifunctional carboxylic acid. It is likely that depending on the degree of conversion the reaction product obtained will comprise a mixture of mono-, di- and non-substituted amino acids.

Thus more preferred mono acid functional imides useful in the present invention that may for example be obtained from succinic acid and may comprise one or more imides having the following structures:

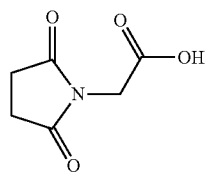 [SMILES: O=C(O)CN1C(=O)CCC1=O]

(also denoted I5 or Imide 5)

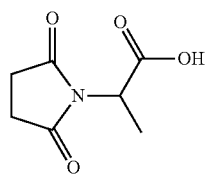

(also denoted I6 or Imide 6),

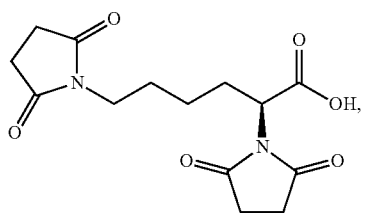 [SMILES: O=C(O)[C@H](CCCCN1C(=O)CCC1=O)N1C(=O)CCC1=O]

(also denoted I7 or Imide 7).

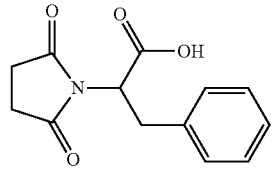 [SMILES: O=C(O)C(Cc1ccccc1)N1C(=O)CCC1=O]

(also denoted I8 or Imide 8).

Other preferred imides obtained from succinic acid may be those imides with structures analogous to those Imides I1 to I4 described above obtained from citric acid.

Other preferred mono acid imides are those obtained from reacting amino acids with at least one anhydride selected from: itaconic anhydride or citraconic anhydride These anhydrides are advantageous as they are currently available from biorenewable sources (or are likely to be available from biorenewable sources in the near future).

Thus in one embodiment of the present invention di-acid functional citric imide derivatives of Formula 2 (preferably one or more of the imides I1 to I5 described above) and/or monoacid functional succinimide derivatives of Formula 3 (usefully one or more of the imides I6 to I9 described above) may be used as a reagent in a polycondensation reaction (e.g. by reacting with other, non-imide containing, mono-, di-, or trifunctional carboxylic acids, for example sebacic acid, 2, 5 furandicarboxylic acid, succinic acid, azelaic acid and/or similar acids), one or more polyols and optionally with autoxidisable fatty acid moieties) to prepare polyester resins (and/or alkyds) of the present invention.

Therefore broadly in accordance with the present invention there is provided a polyester resin obtained by reacting the following components A to E (i.e. (A), optional (A'), (B), optional (C), optional (D) and optional (E)), preferably as described below. Preferably, the polyester resin comprises an alkyd resin and/or a saturated (that may comprise aromatic moieties) polyester powder resin. More preferably the polyester resin comprises an alkyd resin, more preferably having low VOC; even more preferably the polyester resin is an alkyd resin. VOC denotes volatile organic compounds which are organic compounds that have a boiling point from 50 to 250° C. under 1 atmosphere pressure. Low VOC denotes that the amount of VOC present is less than 100 g/l, if a liquid material and less than 100 g per kg if a solid material.

(A) Component A (also referred to herein as the Imide and/or Imide Component) is one or more cyclic imides of Formula 1; preferably one or more citric imide derivatives of Formula 2 and/or succinimide derivatives of Formula 3; more preferably one or more of the imides I1 to I8 described herein. In one embodiment of the invention the Imide component A may be present in powder compositions of the invention (for example obtained from citric acid imide and ethylene glycol) in an amount of from 1 to 90% preferably from 5 to 80% by weight of the total weight of components A to E. In another embodiment of the invention Imide component A may be present in alkyd compositions of the invention in an amount of from 1 to 70% by weight;

(A') Optional Component A' is one or more saturated dicarboxylic acids and/or saturated hydroxy acids. Component A' is not optional in case component A does not comprise dicarboxylic acid or hydroxy acid. Component A' may be used in case component A comprises a dicarboxylic acid and/or hydroxy acid. In the case that component A' is present, the amount of saturated dicarboxylic acid and saturated hydroxy acid is preferably from 1 to 60% by weight of the total weight of components A to E, more preferably from 1 to 40% by weight of the total weight of components A to E, (B) Component B (also referred to herein as the Polyol and/or Polyol Component) is at least one saturated polyhydric alcohol. The Polyol component B may be present in the polyester resin in an amount of from 0.1 to 80%, preferably from 0.2 to 60%, more preferably 0.5 to 40%, most preferably 1 to 30%, by weight of the total weight of components A to E. In an embodiment of the invention wherein the Polyol component B comprises tri—or higher functional Polyol, the Polyol component may be present in powder compositions of the invention in an amount of from 0.1 to 20% of the total weight of components A to E. In a further embodiment of the invention the Polyol component B may be present in alkyd compositions of the invention in an amount of from 0.1 to 80%, preferably from 0.2 to 60%, more preferably 0.5 to 40%, most preferably 1 to 30%, by weight of the total weight of components A to E.

(C) Optional Component C (also referred to herein as the Rosin and/or Rosin Component) is preferably naturally occurring rosin, the rosin comprising from 40 to 80 parts per hundred by weight of rosin of an unsaturated mono carboxylic acid comprising at least one $C_{15-25}$cyclohydrocarbo moiety (optionally comprising at least two preferably three fused rings) capable of undergoing a Diels Alder or Ene reaction (such as abietic acid, palustric acid, levopimaric acid and/or sandaracopimaric acid, derivatives and/or isomers thereof). In a still other embodiment of the invention the Rosin Component C may be present in compositions of the invention in amount from a trace amount to up to 30%, preferably 1 to 30% by weight of the total weight of components A to E. The presence of Rosin Component C is optional as although compositions of the invention may comprise rosin Diels-Alder adducts the rosin may also be absent (0% by weight). For example in a still further embodiment of the invention for example a rosin/citraconic anhydride adduct of the B4 composition described herein may be replaced by (optionally in the same weight) material comprising an imide structure.

(D) Optional Component D (also referred to herein as the Fatty Acid and/or Fatty Acid Component) is preferably at least one linear $C_{12-60}$ hydrocarbo carboxylic acid and/or other analogous $C_{12-60}$fatty components (such as analogous $C_{12-60}$ fatty amines, $C_{12-60}$fatty alcohols and/or other derivatives of the $C_{12-60}$fatty acid) comprising at least one, preferably at least two double bonds, more preferably at least two double bounds selected from a linoleically unsaturated moiety (=linoleic unsaturation) and/or two conjugated ethylenically unsaturated double bonds, most preferably selected from at least one linoleic unsaturation. As used herein linoleic unsaturation denotes a moiety comprising two non-conjugated carbon carbon double bonds which are separated from each other by one carbon atom and such a linoleically unsaturated moiety can be represented by '—C=C—C($R_2$)—C=C—'. Fatty acids, especially those fatty acids obtained from natural sources such as soybean fatty acid, may comprise mixtures of both saturated fatty acids and unsaturated fatty acids. Both types of fatty acid are considered to form part of Component D, even though in some embodiments of the invention unsaturated fatty acids may be preferred. In an embodiment of the invention saturated fatty acids may be present in powder compositions of the invention in an amount of from none to up to 20 parts weight per 100 parts by weight of the total amount of the Fatty Acid Component D. In a different embodiment of the invention saturated fatty acids may be present in alkyd compositions of the invention in an amount of from 30 to 80 parts by weight per 100 parts by weight of total amount of the Fatty Acid Component D. In a still yet other embodiment of the invention the Fatty Acid Component D may be present in compositions of the invention in amount from 25% to 80% preferably 30% to 75%, more preferably from 40% to 60% by weight of the of the total weight of components A to E. The presence of the Fatty Acid Component D is optional as in a still yet further embodiment compositions of the invention the Fatty Acid Component D may also be absent (0% by weight).

(E) Optional Component E (also referred to as the Other Component E) is preferably at least one monofunctional or polyfunctional monomer other than any of Components A to D. In a yet other embodiment of the invention the Other Component E may be present in such an amount such that the amounts of components A to E total 100% and amounts for each component A to D also satisfy the preferred or more preferred amounts given for each component herein. The presence of the Other Component E is optional as in a yet further embodiment compositions of the invention the Other Component E may also be absent (0% by weight) and for example the compositions of the invention may then consist of Components A and B and optionally one, two or all of Components A', C and D.

Components or parts of components that do not fall within the definitions of Components A to D are considered to form part of the optional Other Component E.

The optional amounts by weight for Components A to E given above are calculated based on the total of Components A to E being 100%. If desired an esterification or transesterification catalyst can be used for the synthesis of the polyester resin. Such catalysts are added on top of the total of Components A to E. Examples of such catalysts are tetrabutyl titanate, zinc acetate, etc.

The alkyd resin obtained from process (I) preferably
(i) has an acid value of no more than 50 preferably less than 30 mg KOH per g of the solid polyester (for example alkyd) resin (obtained as described above);
(ii) has a number average molecular weight (Mn) of at least 1200 g/mol and preferably at least 1500 g/mol; and
(iii) optionally has an oil length less than 80;
(iv) optionally has a renewable content (as defined herein) of at least 50%, preferably at least 80%, more preferably at least 90%, for example 100% by weight of components (A) to (E) where present.

The saturated polyester powder resin obtained from process (I) preferably
(i) has an acid value of no more than 100 preferably less than 80 mg KOH per g of the solid polyester resin (obtained as described above);
(ii) has a number average molecular weight (Mn) of at least 1200 g/mol and preferably at least 1500 g/mol; and
(iii) optionally has an oil length less than 80;
(iv) optionally has a renewable content (as defined herein) of at least 50%, preferably at least 80%, more preferably at least 90%, for example 100% by weight of components (A) to (E) where present.

Imides used in the present invention may be prepared by mixing the components and removing water azeotropically by xylene reflux.

The applicant has found that the monoacid imides of Formula 3 obtainable from succinic acid and glycine or lysine (respectively Imide 7 and Imide 9) or other amino acids can be used as a direct replacement of benzoic acid

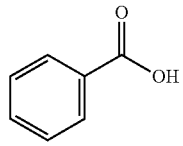

in a conventional polycondensation to prepare a conventional polyester binder suitable for use in a paint. Similarly the diacid imides of Formula 2 obtainable from citric acid and from amino acids such as phenylalanine (Imide 4) and glycine can be used as a direct replacement of phthalic anhydride

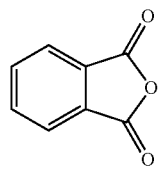 [SMILES: O=C1OC(=O)c2ccccc21]

or isophthalic acid

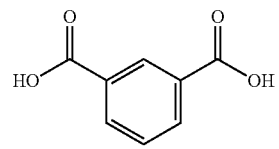 [SMILES: O=C(O)c1cccc(C(=O)O)c1]

to prepare a polyester binder.

Surprisingly the applicant has found that paints that use these (and similar) imide based polyesters exhibit improved or comparable coating properties to the paints that use known polyesters binders based on these aromatic acidic precursors. The imide building blocks are available from biorenewable sources and have less impact on the environment than the aromatic acids typically used as polyester building blocks. Thus these aromatic components can be replaced in whole or in part to provide paints having a higher renewable content and more benign environmental footprint.

In a further aspect of the invention the polyester (for example alkyd) resin of the invention show improved yellowing and a higher drying speed as the optional Rosin Component C and/or Fatty Acid Component D can be reduced or eliminated entirely. For example in a preferred composition of the invention there is no Rosin (Component C is 0%) and/or the amount of Fatty Acid Component D is selected such that the oil length of the composition is below 50% and optionally such that the composition achieves a reduced degree of yellowing.

The imide building blocks used in the present invention are able to replace non-renewable aromatic acid monomers and provide the same level of yellowing, which is a surprising result given that the imide groups contain nitrogen and would have expected to be susceptible to yellowing.

Without wishing to be bound by any mechanism it is not believed that the polar nature of the imide building block has an adverse influence on the emulsification behaviour of these poly(ester-imide)s as for example water sensitivity of the polyester imides of the invention is comparable with prior art polyesters. Furthermore very high Tg values are possible using these imide monomers.

It will be self-evident that the weight percentages of Components (A) to (E) where present in total add up to 100% and the amounts of each given herein are calculated as a proportion of the total amount of these monomer components (A) to (E) being 100%. Thus the optional presence of any other ingredients in polyester (for example alkyd) resin or composition (e.g. surfactant) does not affect these percentage values.

VOC denotes volatile organic compounds (VOC) that have a high vapour pressure that is have a boiling point from 50 to 250° C. under one atmosphere pressure. The term "low VOC" as used herein denotes that the amount of VOC present in a liquid composition or resin is less than 100 g/l, preferably <50 g/l (same values per kg if it concerns a solid material).

Polyester (for example alkyd) resins of the invention may for example be prepared in solvent (e.g. xylene as azeotrope) and/or in the melt, preferably in the melt. Before use the resultant polyester resins may be collected as a solid (e.g. to form a powder composition) or may be dispersed in a suitable carrier fluid (for example dissolved in organic solvent or dispersed in aqueous media, (e.g. as a water borne (WB) emulsion). Preferred polyester resins are dispersed in solvent or are water borne, more preferably are WB. WB polyester (for example alkyd) resins of the invention can be emulsified by conventional means. Polyester (for example alkyd) resins of the invention can be cured by standard siccatives or dryers (oxidation catalysts).

If the polyester (for example alkyd) resin is water borne the emulsion or dispersion may be prepared in the presence of an aqueous medium, preferably comprising at least one surfactant.

Where the resin of the invention is emulsified in water, the process and surfactants that may be used are well known to those skilled in the art. Preferably a mixture of surfactants is used, more preferably a combination of anionic and non-ionic surfactant systems. The surfactant can be added as a separate ingredient not part of Components A to E, and/or one or more of Components A to E may have suitable functional groups thereon to aid dispersion in water, in which case no (or alternatively reduced amount of) separate surfactant may be needed to obtain a stable emulsion.

Examples of surfactant systems that may be used to emulsify alkyd resins are described in US2003-144397 (ICI) and in 'Emulsification and Polymerization of Alkyd Resins' by Jan W. Gooch, Springer, first edition 1 Dec. 2001 (ISBN 0306467178) and the contents of both of these are incorporated herein by reference.

However surprisingly the applicant has found that in another embodiment of the invention optionally surfactants may not be needed as a separate ingredient to stabilise the resins of the present invention. Without wishing to be bound by theory, it is believed that this may be because imides are incorporated into the resin. Thus it is preferred that the aqueous dispersions of the resins of the invention are stabilised internally and the resins of the invention may be self-emulsifying. Internal surfactants systems may thus be formed from ingredients that are incorporated into the resin in whole or in part such as Optional Component E (and/or from other components from which the resin is obtained (such as the Component A imide).

Polyester (for example alkyd) resins of the invention may have an oil length of less than 80, preferably less than 65, more preferably less than 50, even more preferably less than 45, most preferably less than 40. Usefully polyester (for example alkyd) resins of the invention have an oil length of at least 20, more usefully at least 30, most usefully at least 35. Conveniently polyester (for example alkyd) resins of the invention have an oil length of from 20 to 80, more usefully from 30 to 50 and most usefully from 35 to 45, or in alternative embodiment for example from 20 to 40. As used above the oil length is defined as the number of grams of oil used to produce 100 g of the polyester (for example alkyd) resin.

Preferred polyester (for example alkyd) resins of the invention comprise at least 55%, more preferably at least 60%, most preferably at least 80%, for example at least 95% (e.g. about 100%) by weight of components obtained from a bio-renewable (i.e. non-fossil, bio-based) source.

One alternative aspect of the invention provides polyester (for example alkyd) resins that are obtained from reacting the following components:

Acid Component D1 comprising (usefully consisting of) (i) from 0 to 40%, preferably from 1 to 40%, more preferably from 1 to 30% by weight of an oil selected from tung oil, calendula oil, linseed oil and/or, oils that comprise glycerol esters of fatty acids and (ii) optionally from 25 to 80%, preferably from 25% to 79%, more preferably from 30% to 70% by weight of an additional fatty acid and/or oil not in group (B)(i) provided that the total amount of component D is at least 25% by weight. Preferably Component D is selected from TOFA, soya bean fatty acid, linseed oil fatty acid, and/or conjugated fatty acids such as dehydrated castor oil fatty acid, more preferred is TOFA.

All percentages above are calculated by weight with respect to the total amounts of Components A1 to D1 and will be selected such that the sum is 100%.

Unless otherwise indicated herein Components A and A1, B and B1, C and C1 and D and D1 may have the same optional features and preferences as described herein.

Without wishing to be bound by any mechanism it is believed that the above reaction between A1, B1, C1 and D1 may be a polymerisation (for example a step growth polymerisation) a polycondensation and/or addition reaction. Thus one embodiment of the invention may be an addition reaction as exemplified for example by the addition of citraconic anhydride onto a rosin and/or conjugated fatty acid. Another embodiment of the invention may be a condensation reaction, as exemplified for example by the reaction of amino acid with succinic acid/anhydride and citric acid.

It will be appreciated that some or all of the Components (A) to (E) may be added as separate ingredients and/or in one or more mixtures of two or more of Components (A) to (E). For example many common Rosins are derived from Tall Oil Fatty Acids (TOFA) and so are often sold with some TOFA or other fatty acids or oils present as an impurity. For example currently commercial Rosin products exist with a TOFA content up to 27% by weight of the product. Many commercially available fatty acids are also mixtures and for example may include other ingredients such as saturated fatty acids (not part of Component D) as well as the unsaturated fatty acids that comprise Component D.

Component (A) Imide

The specific imides and preferred embodiments thereof that may comprise Component A used in the present invention have already been described above.

Examples of specific imides that may comprise Imide Component A may be any imide obtained by reacting one or more amino acids with one or more of the following acids and/or anhydrides: succinic acid, succinic anhydride, phthalic acid, phthalic anhydride, citric acid, citric anhydride, hexahydrophthalic acid, hexahydrophthalic anhydride, monomethyl hexahydrophthalic acid, monomethyl hexahydrophthalic anhydride and/or any suitable mixtures thereof.

It is strongly preferred that imides of Component A exclude those imides obtainable by reacting amino acids with trimellitic anhydride

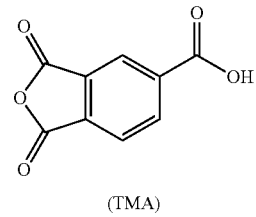

(TMA)

Usefully Component A may be present in the compositions and/or resins of the invention in an amount of at least 1 wt. %, more usefully at least 5 wt. %, even more usefully at least 10 wt. % and most usefully at least 12 wt. %, based on the total weight of components (A) to (D) and optionally (B1) and/or (D1) used to prepare the resin being 100%.

Conveniently Component A may be present in the compositions and/or resins of the invention in an amount of less than 70 wt %, conveniently less than 60 wt %, more conveniently less than 40 wt %, even more conveniently less than 28 wt. %, especially more conveniently less than 25 wt. %, most conveniently less than 20 wt. %, for example less than 15 wt. %, based on the total weight of components (A) to (D) and optionally (B1) and/or (D1) used to prepare the resin being 100%.

Component A may be present in the compositions and/or resins of the invention in an amount of from 1 to 70 wt. %, preferably from 1 to 40 wt. %, more preferably from 5 to 30 wt. %, even more preferably from 10 to 25 wt. %, most preferably from 15 to 22 wt. %, for example 13 to 14 wt. %, e.g. 20 wt. % based on the total weight of components (A) to (D) and optionally (B1) and/or (D1) used to prepare the resin being 100%.

Component (A') (i.e. Saturated Dicarboxylic Acid and/or Saturated Hydroxy Acid)

Usefully Component A' (in the embodiments where it is present) is present in the compositions and/or resins of the invention in an amount of from 1 to 60 wt. %, more usefully from 1 to 40 wt. %, more usefully from 1 to 30 wt. % and even more usefully from 1 to 25 wt. %, based on the total weight of components (A) to (E) used to prepare the resin being 100%. The polyacid or hydroxy acid components of the alkyd resin may be any saturated polyacid or hydroxy acid known in the art used in the formation of an alkyd resin. The dicarboxylic acid may be, for example, isophthalic acid, phthalic anhydride(acid), terephthalic acid, adipic acid, tetrachlorophthalic anhydride, dodecanedioic acid, sebacic acid, azelaic acid, 1,4-cyclohexanedicarboxylic acid, 1,3-cyclohexanedicarboxylic acid, succinic anhydride, succinic acid, 2,6-naphthalenedicarboxylic acid, glutaric acid, and the like. Preferably, the dicarboxylic acid is isophthalic acid, phthalic anhydride or phthalic acid. The hydroxy acid is preferably an alpha hydroxy acid. The hydroxy acid may be, for example, lactic acid.

Component (B) Polyols

Suitable polyols that may comprise Component B (and/or B1) are any of those described and sourced in WO08-101722 page 14 line 24 to page 16 line 11 and this passage is hereby incorporated herein by reference.

Component B may in principle comprise any hydroxy (i.e. OH group) functional compound or mixture of hydroxy functional compounds with a number average hydroxy functionality >2.0. By number average hydroxyl functionality is herein meant to take into account that even though the individual alcohol molecule has a discrete number of hydroxy groups, mixtures of alcohols typically will have a non-discrete medium hydroxy functionality. For example, one molecule may have a hydroxy functionality of 1 and another molecule may have a hydroxy functionality of 3. This will lead to a number average hydroxy functionality of 2 if the numbers of moles of the mono- and trifunctional molecules are the same.

In a preferred embodiment, Component B has a number average hydroxy functionality >2.5, even more preferred >2.8 and most preferred >3.

In a preferred embodiment, Component B has a number average hydroxy functionality of <15, preferably <10, more preferably <8, even more preferably <6 and most preferably <4.5, as this will allow for at least some of the alcohol to participate in crosslinking with neighbouring or the same polymer molecule.

Component B may comprise aliphatic parts and/or aromatic parts dependent on the required properties of the resin.

In one preferred embodiment it was surprisingly found that when the alcohol comprises at least one aliphatic ring, then the resulting resin tend to have an increased hardness.

Component B may comprise other functional groups, such as for example one or more acid groups, amine groups, urea groups, ester groups, unsaturations etc. However, it is preferred Component B has only limited number of other functional groups.

The term polyol and/or alcohol as used herein denotes both individual (pure) alcohols as well as mixtures of alcohols unless otherwise stated. The individual alcohols preferably have a functionality of at least 2 to ensure that the alcohol does not act as an end-capping group. The alcohol may be a mixture of several alcohols with the same or varying functionality (hydroxy and/or other functional groups).

In case the polyester resin is a saturated polyester alkyd resin, preferably less than 50 weight % of Component B has a hydroxy functionality >3. More preferably, from 0 to 10 wt. % of Component B has a hydroxy functionality >3.

In case the polyester resin is an alkyd resin, at least 50 weight % of Component B preferably has a hydroxy functionality >3, more preferably >4. More preferably at least 50 weight % of the alcohol has three functional groups, even more preferably at least 50 weight % of the alcohol has four functional groups. Particularly, it was found to be advantageous to utilize an alcohol, wherein at least 80 weight % of the alcohol has a hydroxy functionality >3, more preferably >4. More preferably at least 80 weight % of the alcohol has three functional groups, even more preferably at least 80 weight % of the alcohol has four functional groups. In a particularly preferred embodiment, the functionality of the alcohol has substantially solely hydroxy functionality, such as at least 90 weight % of the alcohol has hydroxy functionality, or the alcohol has solely (i.e. 100 weight %) hydroxy functionality.

Preferably at least 50 weight % of the alcohol is selected from the group consisting of sorbitans, glycerol, trimethylol propane, pentaerythritol, di-pentaerythritol, tri-pentaerythritol, isosorbide, sorbitol, hydrogenated bisphenol A, ethylene glycol, 2,3- and/or 1,3-propylene glycol, 1,4-butanediol, 2,3-butanediol, poly ethylene glycol, di ethylene glycol, neo pentyl glycol, sugars like for example cellulose, sucrose, fructose and alike, polyglycerols having from 2 to 10 OH groups and mixtures thereof. In a highly preferred embodiment, the alcohol consists substantially of one or more alcohols selected from the group consisting of glycerol, trimethylol propane, pentaerythritol, isosorbide, hydrogenated bisphenol A, ethylene glycol, propylene glycol, poly ethylene glycol, di ethylene glycol, neopentyl glycol. By consisting substantially of is here meant that nearly all of the alcohol, such as more than 90 weight %, more than 95 weight % or more than 98 weight % of the alcohol is selected from the group consisting of glycerol, trimethylol propane, pentaerythritol, isosorbide, hydrogenated bisphenol A, ethylene glycol, propylene glycol, poly ethylene glycol, di ethylene glycol, neopentyl glycol.

Particularly preferred polyols that may be useful as Component B may be selected from: glycerol; pentaerythritol; mannitol, sorbitol, isosorbide, sorbitan and/or mixtures thereof. It is preferred that the polyol is from a biorenewable source.

Usefully Component B may be present in the compositions and/or resins of the invention in an amount of at least 1 wt. %, more usefully at least 5 wt. %, even more usefully at least 10 wt. % and most usefully at least 20 wt. %, based on the total weight of components (A) to (D) and optionally (B1) and/or (D1) used to prepare the resin being 100%.

Conveniently Component B may be present in the compositions and/or resins of the invention in an amount of less than 50 wt. %, more conveniently less than 40 wt. %, even more conveniently less than 35 wt. %, even more conveniently less than 30 wt. %, especially more conveniently less than 28 wt. %, most conveniently less than 25 wt. %, for example less than 22 wt. %, based on the total weight of components (A) to (D) and optionally (B1) and/or (D1) used to prepare the resin being 100%.

Component B may be present in the compositions and/or resins of the invention in an amount of from 1 to 40 wt. %, preferably from 5 to 35 wt. %, more preferably from 10 to 30 wt. %, even more preferably from 15 to 25 wt. %, most preferably from 18 to 24 wt. %, for example 22 wt. % based on the total weight of components (A) to (D) and optionally (B1) and/or (D1) used to prepare the resin being 100%.

Component (C) (e.g. Rosin)

The term "rosin" refers to a chemical mixture isolated from various natural sources, typically "tall oil" which is a by-product of pulping softwoods. Tall oil can also be obtained from the distillation of Crude Tall Oil (CTO). Other sources include gum rosin (commonly found in Portugal and China). Whilst the composition of rosins will vary somewhat according to their source, usually they comprise as a major component unsaturated mono carboxylic acids comprising at least one ring structure (such as those having at least one, preferably two C3-8 cyclohydrocarbo moieties), for example C15-25 cyclohydrocarbo moieties.

Where present the Rosin Component C may usefully comprise an adduct of rosin and citraconic anhydride. However the presence of Rosin Component C is optional as the applicant has found that in general rosin-based polyester (for example alkyd) do not dry very rapidly. In a preferred embodiment of the present invention the Rosin Component C (for example Rosin citraconic anhydride adduct) is replaced as a hard component by imide-containing moieties such as Component A optionally in the same amounts as Component C.

Further features and examples of suitable Rosins for use as optional Component C herein are described in the applicant's co-pending patent application EP12167160.6 (page 11 line 6 to page 14 line 18) and this section of that document is incorporated herein by reference.

Usefully Component C (in the embodiments where it is present) may be present in the compositions and/or resins of the invention in an amount of at least 5 wt. %, more usefully at least 8 wt. %, even more usefully at least 10 wt. % and most usefully at least 15 wt. %, based on the total weight of components (A) to (D) and optionally (B1) and/or (D1) used to prepare the resin being 100%.

Conveniently Component C may be present in the compositions and/or resins of the invention in an amount of less than 28 wt. %, more conveniently less than 25 wt. %, even more conveniently less than 20 wt. %, most conveniently less than 17 wt. %, based on the total weight of components (A) to (D) and optionally (B1) and/or (D1) used to prepare the resin being 100%.

Preferably Component C (in the embodiments where it is present) may be present in the compositions and/or resins of the invention in an amount of from 5 to 28 wt. %, more preferably from 8 to 25 wt. %, even more preferably from 10 to 20 wt. %, most preferably from 15 to 17 wt. %, for example 15.5 wt. % based on the total weight of components (A) to (D) and optionally (B1) and/or (D1) used to prepare the resin being 100%.

Component (D) (e.g. Oils and Fatty Acids)

It will be appreciated that there is a difference between a fatty acid and/or fatty acid derivative and an oil both of which can be used herein as or to provide Component D. Typically what is referred to herein as "oil" (also as "fatty acid oil") denotes a mixture of glycerol esters of one or more fatty acids. Thus for example linseed oil denotes a natural product, whereas linseed oil fatty acid denotes a mixture of fatty acids prepared from linseed oil.

Generally (unless the context dictates otherwise) as used herein the term fatty acid denotes a linear hydrocarbo carboxylic acid that comprises at least one ethylenically unsaturated double bond (i.e. unsaturation is implied in the fatty acid as this is needed for Component D) and preferred fatty acids comprise at least two ethylenically unsaturated double bonds more preferably comprise at least one linoleic unsaturation. However saturated fatty acids may still be present in the compositions of the invention for other reasons. Preferred fatty acids are linear $C_{12-60}$hydrocarbo mono carboxylic acids comprising at least one linoleically unsaturated moiety. As used herein the term 'fatty acid' also encompasses precursors for fatty acids, i.e. any component that under the conditions herein will transform and/or react to form a fatty acid.

Usefully Component D may be present in the compositions and/or resins of the invention in an amount of at least 30 wt. %, more usefully at least 35 wt. %, even more usefully at least 40 wt. % and most usefully at least 50 wt. %, based on the total weight of components (A) to (D) and optionally (B1) and (D1) used to prepare the resin being 100%.

Conveniently Component D may be present in the compositions and/or resins of the invention in an amount of less than 75 wt. %, more conveniently less than 70 wt. %, even more conveniently less than 65 wt. %, most conveniently less than 60 wt. %, based on the total weight of components (A) to (D) and optionally (B1) and (D1) used to prepare the resin being 100%.

Preferably in one embodiment of the invention Component D may be present in the compositions and/or resins of the invention (especially where such compositions are not powder compositions) in an amount of from 20 to 75 wt. %, more preferably from 25 to 70 wt. %, even more preferably from 30 to 65 wt. %, most preferably from 35 to 50 wt. %, for example from 35 to 40 wt % based on the total weight of components (A) to (D) and optionally (B1) and (D1) used to prepare the resin being 100%.

Usefully in another embodiment of the invention Component D may be present in the compositions and/or resins of the invention where such compositions are powder compositions in an amount of from 0 to 20 wt. %, more preferably from 0 to 15 wt. %, even more preferably from 0 to 10 wt. %, most preferably from 1 to 5 wt. %, and for example in a different embodiment 0% wt % based on the total weight of components (A) to (D) and optionally (B1) and (D1) used to prepare the resin being 100%.

Component E

Examples of suitable components E are monocarboxylic acids, amines, isocyanates, (poly)ethers, (poly)siloxanes, (poly)amides, (poly)acrylates.

There is an increasing demand to use bio renewable monomers in order to improve the sustainability of the resins used in for example coating applications. In view of concerns about depletion of fossil fuel resources or an increase in carbon dioxide in the air that poses a global scale environmental problem in recent years, methods for producing raw materials of these polymers from biomass resources have attracted a lot of attention. Since these resources are renewable and therefore have a carbon neutral biomass, such methods are expected to gain in particular importance in the future. It is therefore a preferred feature of the present invention and the aspects described herein that where possible the components used herein as far as possible are biorenewable.

Preferably at least 20 wt. %, more preferably at least 30 wt. %, and especially 40 wt. % of the components (A) to (D) (and optionally (E) used to form the resin of the invention are derived from at least one biorenewable material. Biorenewable materials may be obtained fully or in part from biorenewable sources. Thus it is preferred to also measure the carbon 14 content to determine the biorenewability content of the components (A) to (D) (and optionally (E). The term bio-based is also used herein as a synonym for biorenewable (as defined herein).

The content of carbon 14 (C 14) is indicative of the age of a bio based material. It is known in the art that C 14, which has a half-life of about 5,700 years, is found in bio renewable materials but not in fossil fuels. Thus, "biorenewable materials" refer to organic materials in which the carbon comes from non-fossil biological sources. Examples of biorenewable materials include, but are not limited to, sugars, starches, corns, natural fibres, sugarcanes, beets, citrus fruits, woody plants, cellulosics, lignocelluosics, hemicelluloses, potatoes, plant oils, other polysaccharides such as pectin, chitin, levan, and pullulan, and a combination thereof. C14 levels can be determined by measuring its decay process (disintegrations per minute per gram carbon or dpm/gC) through liquid scintillation counting.

The terms 'optional substituent' and/or 'optionally substituted' as used herein (unless followed by a list of other substituents) signifies the one or more of following groups (or substitution by these groups): carboxy, sulpho, phospho, phosphate, formyl, hydroxy, amino, imino, nitrilo, mercapto, cyano, nitro, methyl, methoxy, selenium and/or combinations thereof and/or suitable salts thereof. These optional groups include all chemically possible combinations in the same moiety of a plurality (preferably two) of the aforementioned groups (e.g. amino and sulphonyl if directly attached to each other represent a sulphamoyl group). Preferred optional substituents comprise: carboxy, sulfo, hydroxy, amino, mercapto, cyano, methyl and/or methoxy and any suitable alkali metal salts thereof.

The term 'hydrocarbo group' as used herein is a sub-set of an organic group and denotes any univalent or multivalent moiety (optionally attached to one or more other moieties) which consists of one or more hydrogen atoms and one or more carbon atoms. Hydrocarbo groups may comprise one or more of the following groups. Hydrocarbyl groups comprise univalent groups formed by removing a hydrogen atom from a hydrocarbon. Hydrocarbylene groups comprise divalent groups formed by removing two hydrogen atoms from a hydrocarbon the free valencies of which are not engaged in a double bond. Hydrocarbylidene groups comprise divalent groups (represented by "R2C=") formed by removing two hydrogen atoms from the same carbon atom of a hydrocarbon, the free valencies of which are engaged in a double bond; Hydrocarbylidyne groups comprise trivalent groups (represented by "RC≡"), formed by removing three hydrogen atoms from the same carbon atom of a hydrocarbon the free valencies of which are engaged in a triple bond. Hydrocarbo groups may also comprise any saturated, unsaturated double and/or triple bonds (e.g. alkenyl, and/or alkynyl respectively) and/or aromatic groups (e.g. aryl) and where indicated may be substituted with other functional groups.

Most preferably organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulfinyl, sulfonyl, phospho, phosphate, amino, imino, nitrilo selenium and/or combinations thereof and/or suitable salts thereof (such as alkali metal salts). Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group):

The term 'alkyl' or its equivalent (e.g. 'alk') as used herein may be readily replaced, where appropriate and unless the context clearly indicates otherwise, by terms encompassing any other hydrocarbo group such as those described herein.

Any substituent, group or moiety mentioned herein refers to a monovalent species unless otherwise stated or the context clearly indicates otherwise (e.g. an alkylene moiety may comprise a bivalent group linked two other moieties). A group which comprises a chain of three or more atoms signifies a group in which the chain wholly or in part may be linear, branched and/or form a ring (including spiro and/or fused rings). The total number of certain atoms is specified for certain substituents for example C1-m organo, signifies an organic group having from 1 to m carbon atoms. In any of the formulae herein if one or more ring substituents are not indicated as attached to any particular atom on the ring, the substituent may replace any hydrogen atom attached to a ring atom and may be located at any available position on the ring which is chemically suitable.

Preferably any of organic groups listed above comprise from 1 to 36 carbon atoms, more preferably from 1 to 18. It is particularly preferred that the number of carbon atoms in an organic group is from 1 to 10 inclusive.

Unless the context clearly indicates otherwise, as used herein plural forms of the terms herein are to be construed as including the singular form and vice versa.

Another aspect of the invention broadly provides a coating composition comprising the polymers of the present invention and/or as described herein.

A further aspect of the invention provides a coating obtained or obtainable from a coating composition of the present invention.

A yet other aspect of the invention broadly provides a substrate and/or article having coated thereon an (optionally cured) coating composition of the present invention.

A yet further aspect of the invention broadly provides a method of using polymers of the present invention and/or as described herein to prepare a coating composition.

A still further aspect of the invention broadly provides a method for preparing a coated substrate and/or article comprising the steps of applying a coating composition of the present invention to the substrate and/or article and optionally curing said composition in situ to form a cured coating thereon. The curing may be by any suitable means, such as thermally, by radiation, by oxidation and/or by use of a cross-linker.

Preferred coating compositions are solvent coating compositions or aqueous coating compositions, more preferably are aqueous coating compositions.

Optionally aqueous coating compositions may also comprise a co-solvent. A co-solvent, as is well known in the coating art, is an organic solvent employed in an aqueous composition to ameliorate the drying characteristics thereof, and in particular to lower its minimum film forming temperature. The co-solvent may be solvent incorporated or used during preparation of polymers of the invention or may have been added during formulation of the aqueous composition.

The coating composition of the invention is particularly useful as or for providing the principle component of coating formulations (i.e. composition intended for application to a substrate without further treatment or additions thereto) such as protective or decorative coating compositions (for example paint, lacquer or varnish) wherein an initially prepared composition optionally may be further diluted with water and/or organic solvents, and/or combined with further ingredients or may be in more concentrated form by optional evaporation of water and/or organic components of the liquid medium of an initially prepared composition.

The coating composition of the invention may be applied to a variety of substrates including wood, board, metals, stone, concrete, glass, cloth, leather, paper, plastics, foam and the like, by any conventional method including brushing, dipping, flow coating, spraying, and the like. The coating composition of the invention may also be used to coat the interior and/or exterior surfaces of three-dimensional articles. The carrier medium may be removed by natural drying or accelerated drying (by applying heat) to form a coating.

The coating composition of the invention may contain other conventional ingredients including pigments, dyes, emulsifiers, surfactants, plasticisers, thickeners, heat stabilisers, levelling agents, anti-cratering agents, fillers, sedimentation inhibitors, UV absorbers, antioxidants, dispersants, reactive diluents, waxes, neutralising agents, adhesion promoters, defoamers, co-solvents, wetting agents and the like introduced at any stage of the production process or subsequently. It is possible to include fire retardants (such as antimony oxide) to enhance the fire retardant properties.

It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination.

The object of the present invention is to solve some or all of the problems or disadvantages (such as identified herein) with the prior art.

Unless the context clearly indicates otherwise, as used herein plural forms of the terms herein are to be construed as including the singular form and vice versa.

Preferred utility of the resin and coating compositions of the present invention is use in decorative applications such as paints and/or to form a coating such as a water-borne, solvent-borne or powder coating.

One embodiment of the present invention provides powder coating compositions comprising saturated polyester resins of the present invention.

The term "powder" as used herein indicates a composition that comprises a collection of loose solid particles wherein the individual particles have a maximum particle size of at most 130 μm at 23° C. and at atmospheric pressure, for example a particle size of at most 110 μm, for example of at most 90 μm at 23° C. and at atmospheric pressure. A powder that is in a form suitable for application to a substrate as a coating (optionally formulated with other ingredients) is also referred to herein as a 'powder coating composition', although such compositions depending on the context, can also just be referred to herein as 'powders'. The term 'powder coating' as used herein is the partially or fully cured (crosslinked) form of the powder coating composition of the invention after it has been applied to a substrate. In other words the powder coating is derived upon partial or full cure of a powder coating composition (or powder)

Powders of the invention may have some or all of the following general characteristics. Powders are dry, finely divided, free flowing, solid materials at room temperature and at atmospheric pressure. Powders are benign to the user and the environment since they are virtually free of volatile organic solvents and emit little, if any, volatile materials when cured. Powders are also clean and convenient to use since they are applied to the substrate in dry solid form. Powders are easily collected if spilt and do not require special cleaning or containment supplies, so improving working hygiene. Powders are essentially 100% recyclable since sprayed powders can be fully reclaimed and recombined with fresh powder feed. Powder coating compositions can be prepared ready to use as no thinning or dilution is required before coating. Preferably powder coating compositions of the invention contain low amounts (for example. no more than 20%, e.g. <10% or none) of fatty acid or fatty acid oils.

Powders of the invention comprise finely divided particles of the saturated polyester resins of the present invention. Optionally if the powder is a thermosetting powder, the composition may also comprise a cross-linker. Powders also usually contain pigments, fillers, and other additives. After application to the substrate, the individual powder particles are melted in an oven and coalesce to form the powder coating as a continuous film. Powder coatings have decorative and protective properties associated with conventional organic coatings. Powders are applied by fusion-coating processes as during the coating process the powder particles are fused or melted. Although this is usually carried out in a convection oven, infrared, resistance, and induction heating methods have also been used. Therefore, with minor exceptions, powder coatings are usually applied in factories using fixed installations and are less commonly used in repair or maintenance applications. Powders are typically applied to a substrate using an electrostatic spray process; the powder being dispersed in an air stream and passed through a corona discharge field where the particles acquire an electrostatic charge. The charged particles are attracted to and deposited on the grounded object to be coated. The object (usually sprayed at room temperature), is then placed in an oven where the powder melts and optionally cures with the crosslinker to form a powder coating. A hybrid application process has also been developed using a combination of high voltage electrostatic charging and fluidized-bed techniques (such as electrostatic fluidized bed). Powders have also been applied by triboelectric methods. Powders are widely used to coat many familiar items such as lawn and garden equipment, patio and other metal furniture, electrical cabinets, lighting, shelving, store fixtures and many automotive components. Besides metal coating, wood products, plastic products and/or any substrates where low temperature curing is desirable are coming more and more in perspective. Powder coatings are widely used with thousands of installations in the factories of original equipment manufacturers (OEMS) and custom coating job shops.

Powder coating compositions can be thermosetting or thermoplastic. Preferably the powders of the present invention are thermosetting powder coating compositions. The preparation of thermosetting powder coating compositions is described by Misev in "Powder Coatings, Chemistry and Technology" (pp. 224-300; 1991, John Wiley).

Saturated polyester resins of the invention that are particularly suitable for use in a powder coating composition of the invention are those resins that are solid at 23° C. and at atmospheric pressure (=1 atm) (e.g. under Standard Conditions).

In preferred powder coating compositions the glass transition temperature (Tg) of the resin is at least 40, more preferably at least 42, even more preferably at least 45, most preferably at least 48, for example at least 50° C. The glass transition temperature (Tg) of the resin is preferably at most 100, more preferably at most 90 even more preferably at most 80, most preferably at most 75, for example at most 70° C.

The glass transition temperature (Tg) of the uncured (optionally thermosetting) powder coating composition of the invention is preferably at least 20° C., more preferably at least 25° C., even more preferably at least 35° C., most preferably at least 45° C. The glass transition temperature (Tg) of the uncured thermosetting powder coating composition is preferably at most 100° C., more preferably at most 90° C., even more preferably at most 80° C., most preferably at the most 70° C.

As used herein, the glass transition temperature is measured via Differential Scanning calorimetry (DSC) on a TA instruments DSC Q 20 apparatus, in $N_2$ atmosphere calibrated with indium, within 24 hours from the time of preparation of the entity (freshly prepared entities). The processing of the signal (DSC thermogram, Heat Flow vs. Temperature) was carried out using Universal Analysis 2000 software version 4.5a provided by TA instruments, as described herein after:

For the determination of the $T_g$ of the polyester a sample of 10±5 mg was weight and placed in the DSC cell. The sample was heated up to 150° C. at a heating rate of 40° C./minute. Once the sample has reached 150° C., the temperature was maintained at 150° C. for 10 minutes. Subsequently, the sample was cooled down to 0° C. by a jump step (thermograph B); the next step is an equilibration once the sample has reached 0° C. Subsequently, the sample was heated up to 100° C. at a heating rate of 5° C./minute (thermograph C). Thermographs A, B and C were processed as the Y axis of the thermographs representing the heat flow having exotherm up and endotherm down. Thermograph C was used to measure the $T_g$ and this was the inflection point temperature of the temperature range over which the glass transition took place, said inflection point temperature was the point on the thermal curve corresponding to the peak of the first derivative (with respect to time) of the parent thermal curve. This point corresponds to the inflection point of the parent thermal curve, as defined in § 3.2.1.3 in ASTM E 1356-08.

For all upper and/or lower boundaries of any parameters given herein, the boundary value is included in the value for each parameter.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non-exhaustive the sum of the percentage for each of such components may be less than 100% to allow a certain percentage for additional amount(s) of any additional component(s) that may not be explicitly described herein.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole.

Compositions of and/or used in the present invention may also exhibit improved properties with respect to known compositions that are used in a similar manner. Such improved properties may be (preferably as defined below) in at least one, preferably a plurality, more preferably three of more of those properties described herein. Preferred compositions of and/or used in the present invention, may exhibit comparable properties (compared to known compositions and/or components thereof) in two or more, preferably three or more, most preferably in the rest of those properties described herein.

Improved properties (or improvement) as used herein means the value of the component and/or the composition of and/or used in the present invention is >+8% of the value of the known reference component and/or composition described herein, more preferably >+10%, even more preferably >+12%, most preferably >+15%.

Comparable properties as used herein means the value of the component and/or composition of and/or used in the present invention is within +/−6% of the value of the known reference component and/or composition described herein, more preferably +/−5%, most preferably +/−4%.

The percentage differences for improved and comparable properties herein refer to fractional differences between the component and/or composition of and/or used in the invention and the known reference component and/or composition described herein where the property is measured in the same units in the same way (i.e. if the value to be compared is also measured as a percentage it does not denote an absolute difference).

In particular Reduced Yellowing is defined herein to show an improvement (i.e. less) yellowing with respect to a Reference Coating (as described herein) as measured by Δb values taken after at least one week (preferably after three weeks) where the Δb values of the coatings of the invention are improved (lower) by the percentages stated above to indicate improvements. Preferably Reduced Yellowing results in improved or comparable performance (with respect to the Reference Coating as defined herein) in at least one (preferably all of) the following properties: gloss, hardness, low VOC, DFT, and/or TFT The Reference Coating ('Comparative example') is prepared as nearly identical as practical to the coating of the invention that is tested with the exception that in Reference Coating the Imide Component A (whether present as a monomer and/or as diluent) is replaced by the same weight of an ester obtained from reacting the acid used to obtain Imide A and the same alcohol (or alcohols) as for Component B. If Component A is a mixture then the Reference Coating is prepared from the same weight of the ester as the total amount of the Component A mixture.

Unless otherwise indicated all the tests herein are carried out under standard conditions as also defined herein.

Acid Number

The acid number (or AN) is given as the mass of potassium hydroxide (KOH) in milligrams that is required to neutralize one gram of the tested substance and is used as a measure of the concentration of carboxylic acid groups present. AN is determined conventionally by titration and/or using ASTM D974.

Assessment of Coating

Where indicated in some of the above tests, the performance of a coating can be assessed by assessing the damage to the coating. Damage is preferably assessed either by measuring the weight percentage of the coating left on the substrate after the test but the coating can also be evaluated visually using the rating scale below where 5 is the best and 1 is the worse:

5=very good: no visible damage or degradation/discoloration;
4=only slight visible damage or haze/blooming;
3=clear damage or haze/blooming;
2=coating partially dissolved/damaged;
1=very poor; coating is completely dissolved/damaged Gloss Measurement Method:

Gloss measurements were carried out on a BYK Gardner micro TRI gloss 20 60 85 glossmeter in accordance with ASTM D523 89.

König Hardness

König hardness was determined following DIN 53157 NEN 5319 using an Erichsen hardness equipment. The values are given in seconds (s). Preferably the unpigmented composition of the invention has a König hardness of at least 30 seconds after 4 weeks.

Molecular Weight Determination (Weight Average Mw):

Unless the context dictates otherwise, the molecular weights referred to in this application are weight average molecular weight (also denoted herein as Mw) as determined on an Alliance Waters 2695 GPC with two consecutive PL-gel columns, type Mixed-C, 1/d=300/7.5 mm (Polymer Laboratories), size of column particles 10 µm, using stabilised tetrahydrofuran (THF) modified with 0.8% acetic acid as the eluent at 1 mL/min at 40° C. and using an Alliance Waters 2414 refractive index detector at 40° C. A set of polystyrene standards with a molecular weight range of from 500 to $7 \times 10^6$ g/mol was used to calibrate the GPC equipment.

Molecular Weight Calculation (Number Average Mn):

Unless the context dictates otherwise where a number average molecular weight (also denoted herein as Mn) is mentioned this is measured using the same apparatus in the manner described above.

Particle Size

The particle size values given herein may be measured using a chromatographic technique in a Polymer Labs Particle Size Distribution Analyser (PSDA) and the values used herein are the volume mean. The particle sizes are quoted as a linear dimension which would be the diameter of an approximate spherical particle having the same volume as the volume mean measured.

Standard Conditions

As used herein, unless the context indicates otherwise, standard conditions (e.g. for drying a film) means a relative humidity of 50%±5%, ambient temperature (23° C.±2°) and an air flow of less than or equal to 0.1 m/s.

Drying Properties (Cotton Wool Dust Free Time (DFT) and Tack Free Time (TFT) Tests).

A cotton wool adhesion test measures the rate of surface drying of a coating film. The cotton wool adhesion test was conducted on a coating film applied with a 100 µm slit applicator on a glass plate. After applying the coating composition, a swatch of cotton wool (a loose ball of approximately 0.2 g and a diameter of approximately 3 cm) was dropped from a height of 5 cm on the paint film. After 10 seconds the glass panel was turned over 180° and it was observed if the cotton wool dropped off without leaving cotton fibres on the surface. When the cotton wool did not stick to the surface, the time was recorded as the dust free time. For the tack free time the same procedure was used, but now a weight of 1 kg was placed on the cotton wool. The tack free time was always determined after dust-free properties were reached.

Water Resistance:

A 100 µm wet film was cast on a Leneta chart and dried for 24 hours under standard conditions. Then three drops of water were placed on the film and one drop of water was removed after 30 minutes, a further one after one hour and the final one after 3 hours. The water resistance was assessed immediately after removal of the water and after 24 hours. The rating for water resistance is from 0=very poor, dissolved, 3=acceptable, 5=excellent, no damage of the coating.

Water resistance can also be measured quantitatively using the following test. The composition to be tested is applied to a film as described above in the wet adhesion test. The coated test specimens were soaked in tap water at 40 degrees C. for seven days at room temperature (20 degree C.). The weight gain was recorded at end of this period (and at suitable intervals throughout) to calculate the relative water uptake of the specimens. Other methods may also be used to evaluate the water resistance of compositions of the invention, such as the method described below.

Early water resistance may be measured in as follows. A 250 µm thick layer of the polymer coating to be tested is applied to a Leneta chart. The polymer is allowed to dry for 24 hours at room temperature to form a film coating. Three drops of water are applied to the film. The first drop is removed after 15 minutes, the second drop after 30 minutes and the third drop after 120 minutes. A film with excellent water resistance will not turn white nor will it blister, this rated "5". Poor water resistance, where the film either strongly whitens or blisters, is rated "0".

Yellowing:

Colour change due to yellowing is measured according to CieLab. A coating film is applied with a 100 µm slit applicator on a glass plate and dried for one week at room temperature. Then initial colour according to CieLab (L-value, a-value, b-value) is measured and b-value recorded. Next the film is stored in an oven at 50° C. for one week. Again colour is measured and change in b-value is recorded as Δb. The higher Δb, the stronger the yellowing is. Reliability is improved by further measurements after 2 weeks. Reduced Yellowing is defined herein and preferred polyester resins and compositions of the invention exhibit Reduced Yellowing.

The applicant has surprisingly found that unlikely prior art imide resins in general the imide based resins of the invention are not strongly coloured and also they do not yellow to a great extent.

Many other variations embodiments of the invention will be apparent to those skilled in the art and such variations are contemplated within the broad scope of the present invention.

Further aspects of the invention and preferred features thereof are given in the claims herein.

EXAMPLES

The present invention will now be described in detail with reference to the following non limiting examples which are by way of illustration only.

Example 1: Imide

As an example citric acid glycine imide (formula I1) was prepared by introducing in a 1 liter glass reactor, fitted with mechanical stirrer, nitrogen inlet, thermocouple and Dean-Stark trap, 192.1 grams (1 mole) citric acid, 75.1 grams (1 mole) glycine and 200 grams of xylene; heating the mixture to reflux at 140° C. for about 4 hours when 36 grams of water was collected in the trap; and removing the solvent by vacuum distillation. The brown viscous liquid material was poured out and solidified into a brittle and clear solid. The identity was confirmed by H NMR, and purity estimated to be at least 95%.

Example 2: Imide

Citric acid phenylalanine imide (formula I3) was prepared by reacting according to the process of example 1, 192.1 grams (1 mole) citric acid and 165.2 grams (1 mole) L-phenylalanine. The resulting product was a reddish brown viscous liquid material, which solidified into a brittle and clear solid.

Example 3: Resin

A citric imide alkyd was prepared by a two-step procedure using the same equipment of example 1. First an alkyd prepolymer was made by reacting 68.1 grams pentaerythritol, 71.7 grams benzoic acid and 185.2 grams soybean fatty acids to an acid value of 4.8 mgKOH/g at 230° C. using xylene azeotropic water removal. After this 143.5 grams of solid, ground imide from Example 2 was introduced at 150-170° C. in portions under stirring and temperature was raised to max 220° C. The mixture was reacted to low acid value by azeotropic water removal, and the resin was diluted in xylene and poured out.

Example 4: Imide

Succinic acid glycine imide (formula I5) was prepared by introducing in a 2 liter glass reactor, fitted with mechanical stirrer, nitrogen inlet, thermocouple and Dean-Stark trap, 622.8 grams succinic acid, 377.2 grams glycine and a suitable amount of xylene; heating the mixture to reflux at 140-180° C. for about 10 hours when 176 grams of water was collected in the trap; and removing the solvent by vacuum distillation. The brown viscous liquid material was poured out and solidified into a brittle and clear solid. The identity was confirmed by H NMR.

Example 5: Imide

Succinic acid lysine diimide (formula I7) was prepared as follows: A 50% solution of 765.3 grams succinic acid in xylene was heated to 125° C. in a 3 liter glass reactor, fitted with mechanical stirrer, nitrogen inlet, thermocouple and Dean-Stark trap. 782.5 grams of a 53% solution of lysine in water (commercially available from Ajinomoto Eurolysine SAS as LLB-50) was dosed during 2 hours while removing water azeotropically. Water removal is continued until no reaction water is formed anymore and xylene is distilled off at maximum 160° C. The brown viscous liquid material was poured out and solidified into a brittle and clear solid.

Example 6: Imide

Succinic acid phenylalanine imide (formula I8) was prepared by reacting according to the process of example 4, 192.1 grams succinic acid and 165.2 grams L-phenylalanine. The resulting product was a reddish brown viscous liquid material, which solidified into a brittle and clear solid.

Examples 7-9: Resins

Succinimide based alkyds were prepared by a two-step procedure using the same equipment of example 4: First a prepolymer was made from 367 grams of soybean oil fatty acids, 234 grams of pentaerythritol, 200 grams of succinimide from example 4, 5 or 6, and 193 grams of phthalic anhydride using azeotropic water removal at 230° C. After reaching an acid value below 5 mgKOH/g, 38 grams of succinic acid were added and reaction was continued until acid value dropped below 15 mgKOH/g. After cooling down further xylene was added to obtain a clear low viscosity liquid resin with properties as shown in table 1.

Comparative Example A: Resin

A comparative resin was prepared by reacting in a 2 liter glass reactor, fitted with mechanical stirrer, nitrogen inlet, thermocouple and Dean-Stark trap, 368 grams of soybean oil fatty acids, 266 grams of pentaerythritol, 163 grams of benzoic acid, 285 grams of phthalic anhydride and a suitable amount of xylene using azeotropic water removal at 230° C. until an acid value below 15 mgKOH/g was obtained. After cooling down further xylene was added to obtain a clear low viscosity liquid resin with properties as shown in table 1.

TABLE 1

Resin characteristics

| Example | Resin based on: | Imide example | Solids content (%) | Acid value mgKOH/g | Mn Da | Mw kDa |
|---|---|---|---|---|---|---|
| 3 | BA*, Phenylalanine citric imide | 2 | 64.9 | 12 | 2550 | 10 |
| 7 | PA*, Glycine succinimide | 4 | 62.1 | 10 | 3010 | 47 |
| 8 | PA, Lysine succinic diimide | 5 | 65.5 | 14 | 2500 | 13 |

TABLE 1-continued

| Example | Resin based on: | Imide example | Solids content (%) | Acid value mgKOH/g | Mn Da | Mw kDa |
|---|---|---|---|---|---|---|
| 9 | PA, Phenylalanine succinimide | 6 | 61.0 | 12 | 2630 | 43 |
| Comp A | PA and BA | none | 74.7 | 10 | 3420 | 37 |

*PA = phthalic anhydride, BA = benzoic acid

Example 10: Resin

An alkyd containing succinimide and citric imide was prepared by a two-step procedure using the same equipment of example 4: 285 grams of soybean oil fatty acids, 140 grams of pentaerythritol, 40 grams of sebacic acid and 197 grams of succinic acid lysine diimide (example 5) were charged to a reactor fitted with thermocouple, stirrer, nitrogen flow and Dean-Stark trap, and heated to 220° C. After reaching an acid value below 5 mgKOH/g, the reactor was cooled to 150° C. and 181 grams of citric acid phenylalanine imide (example 2) were charged to the reactor. The reactor was heated to 180° C. under xylene reflux conditions and the distillation was stopped when the acid value dropped below 15 mgKOH/g. Next vacuum distillation was performed for removal of xylene azeotropic solvent and finally the resin was poured out.

Example 11: Emulsion Resin 301 grams of the solid resin from example 10 were emulsified as follows. The resin was heated to between 50-80° C. and 27 grams of a 30% solution of a highly branched alcohol based surfactant combining anionic and non-ionic components and 84 grams of demineralised water were added. The mixture was neutralised with a non-amine base and was stirred until homogeneous. Demineralised water was added during 2 hours until a solids content of 50% was obtained. The emulsion showed a milky appearance and was stable.

Example 12: Emulsion Resin

The succinimide resin from example 8 was emulsified as follows. Xylene was removed by vacuum distillation, and the resin was dissolved in acetone at 64%. 229 grams of this solution were heated to 50° C. and neutralised with a non-amine base. 220 grams of demineralised water were added under stirring. Acetone was removed by vacuum distillation. The emulsion showed a milky appearance and was stable.

Example 13: Emulsion Resin

A 1:1 (on solids) mixture of succinimide resins from example 8 and example 9 was emulsified as follows. Xylene was removed by vacuum distillation, and the resin was dissolved in acetone at 65%. 230 grams of this solution were heated to 50° C. and neutralised with a non-amine base. 225 grams of demineralised water were added under stirring. Acetone was removed by vacuum distillation. The emulsion showed a milky appearance and was stable.

Comparative Example B: Emulsion Resin

Commercially available Uradil AZ-760 (ex DSM Resins) was denoted as Comparative Emulsion resin B.

Example 14: Paints

Paints were produced by mixing in a Cowless dissolver resin solution (44 grams solid resin), 28 grams of Tioxide TR 92 (pigment) and 0.30 grams of Nuosperse FA 601 (dispersant) and milling them into a mill paste. To this paste were added under stirring 0.26 grams Octasoligen Cobalt 10 (cobalt drier) 0.70 grams Calcium naphthenate (calcium drier), 1.83 grams Octasoligen Zirconium 12 (zirconium drier), 0.3 grams Borchinox M2 (antiskinning agent) 3-5 grams Dowanol PM (methoxypropyleneglycol) and xylene to give application viscosity.

These paints showed the following properties (table 2).

TABLE 2

Paint properties

| | Resin from example: | |
|---|---|---|
| | Comp A | 3 |
| Drying dust free (hrs:min) | <0:30 | 1:00 |
| König Hardness 1 day | 24 | 17 |
| König Hardness 28 days | 70 | 55 |
| Yellowing in the dark at 50° C. | | |
| b* Initial | 2.73 | 4.81 |
| Ab* after 14 days 50° C. | 1.38 | 1.48 |
| Water resistance average value (1-5) | 4.3 | 4.0 |

Results in table 2 show that properties of a paint according to the invention are (almost) equal to than those of the comparative paint. It is concluded that this type of imide can replace phthalic anhydride as a monomer in an alkyd resin.

Example 15: Paints

Paints were produced by mixing in a Cowless dissolver resin solution (44 grams solid resin), 28 grams of Tioxide TR 92 (pigment) and 0.30 grams of Nuosperse FA 601 (dispersant) and milling them into a mill paste. To this paste were added under stirring 0.26 grams 0.31 grams Borchi-Oxy-Coat (iron drier), 0.70 grams Calcium naphthenate (calcium drier), 1.83 grams Octasoligen Zirconium 12 (zirconium drier), 0.3 grams Borchinox M2 (antiskinning agent) and xylene to give application viscosity.

These paints showed the following properties (table 3).

TABLE 3

Paint properties

| | Resin from example: | | | |
|---|---|---|---|---|
| | Comp A | 7 | 8 | 9 |
| Drying Dust free time (hrs:min) | 0:24 | 0:19 | 0:16 | 0:23 |
| Drying Tack free time (hrs:min) | 1:39 | 0:34 | 0:31 | 1:38 |

TABLE 3-continued

| Paint properties | Resin from example: | | | |
|---|---|---|---|---|
| | Comp A | 7 | 8 | 9 |
| König Hardness 1 day | 34 | 31 | 44 | 53 |
| König Hardness 15 days | 73 | 76 | 83 | 89 |
| Yellowing in the dark at 50° C. | | | | |
| b* Initial | 2.46 | 2.91 | 2.85 | 2.71 |
| Δb* after 14 days 50° C | 1.32 | 1.50 | 1.45 | 1.69 |
| Water resistance average value (1-5) | 4.7 | 4.4 | 4.3 | 4.7 |

Results in table 3 show that properties of paints according to the invention are equal or better than those of the comparative paint. Especially hardness development and/or drying behavior are improved. It is concluded that this type of imide can replace benzoic acid as a monomer in an alkyd resin.

Example 16: Emulsion Paints

A paste was produced by mixing in a Cowless dissolver 5 grams of demi water, 22.5 grams of Tioxide TR 92 (pigment), 1.1 grams of Disperbyk 2015 (dispersant) and 0.1 grams of Byk 028 antifoam agent and milling them into a mill paste. To this paste were added under stirring resin emulsion (25 grams solid resin), 0.88 grams Borchi-Oxy-Coat 1101 diluted 9:1 in demi water (iron drier), 7.2 grams of Acrysol RM2020 (thickener) and demi water to give solids content of 48%.

These emulsion paints showed the following properties (table 4).

TABLE 4

| Paint properties | Resin from example: | | |
|---|---|---|---|
| | Comp B | 12 | 13 |
| Drying Dust free time (hrs:min) | 0:40 | 0:40 | 0:35 |
| Drying Tack free time (hrs:min) | 3:10 | 3:10 | 2:45 |
| König Hardness 1 day | 17 | 20 | 23 |
| König Hardness 28 days | 34 | 42 | 51 |
| Yellowing in the dark at 50° C. | | | |
| b* Initial | 2.40 | 2.58 | 2.59 |
| Δb* after 14 days 50° C | 1.86 | 2.05 | 1.93 |
| Water resistance average value (1-5) | 5.0 | 3.0 | 4.2 |

Results in table 4 show that properties of emulsion paints according to the invention are equal or better than those of the comparative paint. Especially hardness development is improved and drying behavior is improved when applying resin of example 13. It is concluded that this type of imide can replace benzoic acid as a monomer also in an alkyd emulsion resin.

The invention claimed is:

1. A polyester resin comprising an alkyd resin and/or a saturated polyester resin, wherein said polyester resin is obtained by reacting the following components A to E in a process (I):

(A) Component A comprises one or more cyclic imides of Formula 1;

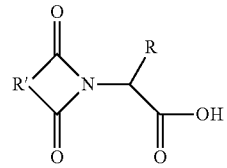

wherein R' represents a divalent optionally substituted saturated aliphatic C1-30 organo moiety; and
R represents H or a monovalent optionally substituted saturated C1-30 organo moiety;

(A') Component A' comprises a saturated dicarboxylic acid and/or a saturated hydroxy acid, wherein component A' is optional only if component A comprises a dicarboxylic acid or a hydroxy acid;

(B) Component B comprises at least one saturated polyhydric alcohol;

(C) Optional Component C comprises naturally occurring rosin, the rosin comprising from 40 to 80 parts per hundred by weight of rosin of an unsaturated mono carboxylic acid comprising at least one C15-25 cyclohydrocarbo moiety capable of undergoing a Diels Alder or Ene reaction;

(D) Optional Component D comprises at least one linear C12-60 hydrocarbo carboxylic acid optionally comprising at least two linoleically unsaturated double bonds;

(E) Optional Component E other than any of Components A to D, wherein Component E is selected from the group consisting of monocarboxylic acids, amines, isocyanates, (poly)ethers, (poly)siloxanes (poly)amides and (poly)acrylates.

2. The polyester resin according to claim 1, wherein R represents a monovalent optionally substituted saturated $C_{1-30}$ organo moiety.

3. The polyester resin according to claim 1, wherein R represents a monovalent substituted saturated $C_{1-30}$ organo moiety.

4. The polyester resin according to claim 1, wherein R' represents a divalent substituted aliphatic saturated $C_{1-30}$ organo moiety and R represents a monovalent optionally substituted saturated $C_{1-30}$ organo moiety.

5. The polyester resin according to claim 1, wherein R' represents a divalent aliphatic substituted saturated $C_{1-30}$ organo moiety and R represents a monovalent substituted saturated $C_{1-30}$ organo moiety.

6. The polyester resin according to claim 1, wherein R' represents a divalent substituted aliphatic saturated $C_{1-20}$ hydrocarbo, and R represents a substituted saturated $C_{1-20}$ hydrocarbo.

7. The polyester resin according to claim 1, wherein R' represents an aliphatic saturated $C_{1-6}$ hydrocarbylene substituted by one or more imido, carboxy and/or hydroxyl, and R represents a saturated $C_{1-6}$ hydrocarbyl substituted by one or more imido, phenyl, carboxy and/or hydroxy.

8. The polyester resin according to claim 1, wherein the polyester resin is an alkyd resin and wherein Component D is not optional and is present in an amount of at least 20% by weight of the total amount of Components A to E.

9. The polyester resin according to claim 1, wherein the polyester resin is a saturated polyester resin and wherein the Component C and the Component D are absent.

10. The polyester resin according to claim 1, wherein the cyclic imides of Formula 1 are represented by one or more citric imide derivatives of Formula 2:

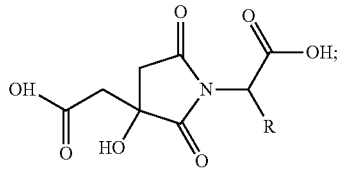

Formula 2 and/or
one more succinimide derivatives of Formula 3:

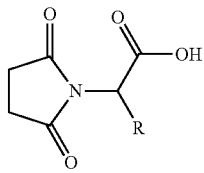

Formula 3 wherein R in Formulae 2 and/or 3 independently represents H or a monovalent optionally substituted saturated C1-30 organo moiety.

11. The polyester resin according to claim 1, wherein the cyclic imides of Formula 1 are represented by one or more citric imide derivatives of Formula 2:

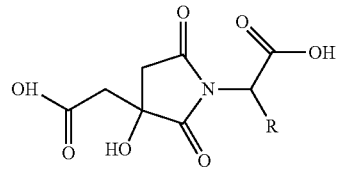

Formula 2 wherein R in Formula 2 independently represents H or a monovalent optionally substituted saturated C1-30 organo moiety.

12. The polyester resin according to claim 1, wherein the cyclic imides of Formula 1 are selected from the group consisting of:

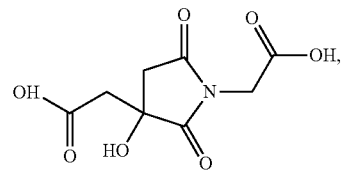

(I1)

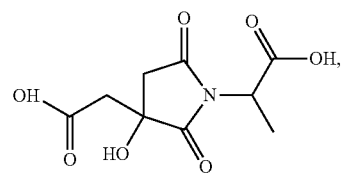

(I2)

-continued

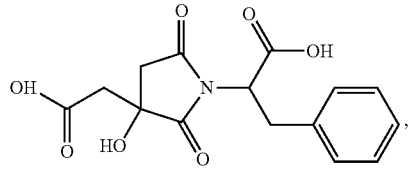

(I3)

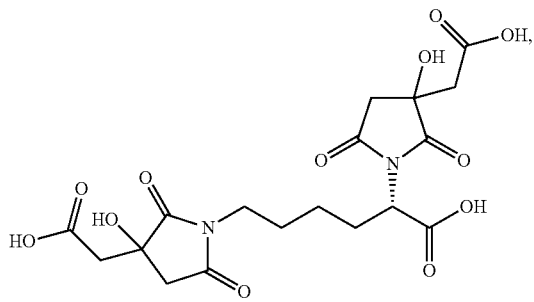

(I4)

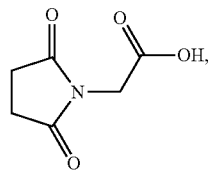

(I5)

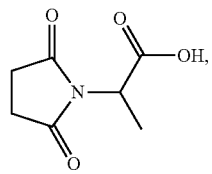

(I6)

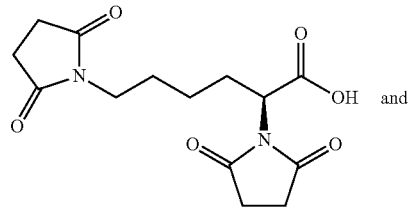

(I7) and

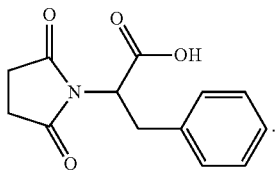

(I8)

13. The polyester resin according to claim 1, wherein the cyclic imides of Formula 1 are selected from the group consisting of:

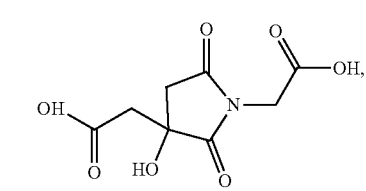

(I1)

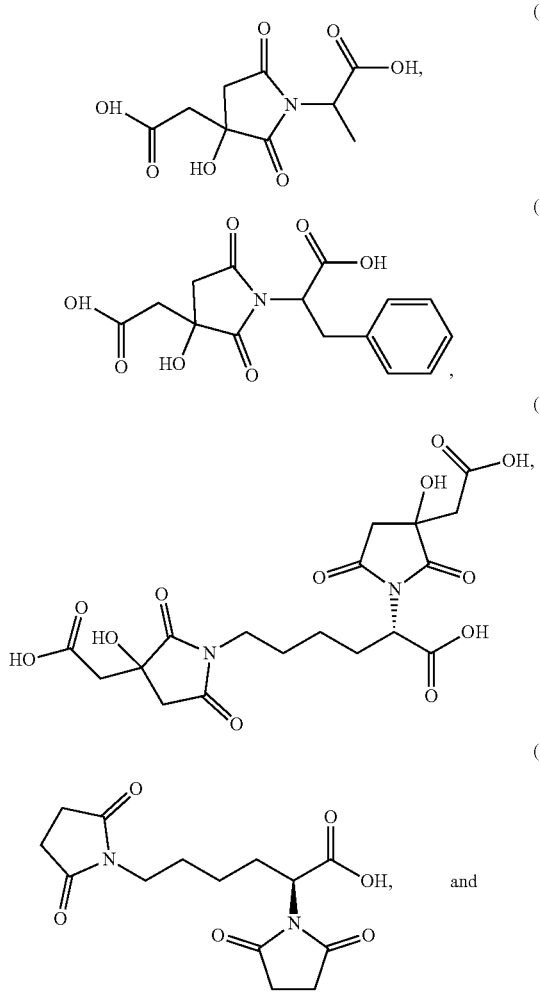

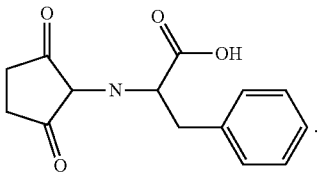

14. The polyester resin according to claim 1, wherein the Component A is present in an amount of from 1 to 90% by weight of the total amount of Components A to E and such that the amount of A to E totals 100%.

15. The polyester resin according to claim 1, wherein the Component B is present in an amount of from 1 to 40% by weight of the total amount of Components A to E and such that the amount of A to E totals 100%.

16. The polyester resin according to claim 1, wherein at least 20% by weight of the total amount of Components A to E comprise biorenewable material.

17. An emulsion comprising a polyester resin as claimed in claim 1 dispersed in an aqueous medium.

18. A coating composition comprising an emulsion as claimed in claim 17.

19. A coating composition comprising a polyester resin as claimed in claim 1.

20. The coating composition according to claim 19, wherein the coating composition is a powder coating composition.

21. A coating obtained from a coating composition as claimed in claim 19.

22. A method of preparing a coated article or a coated substrate comprising the step of coating an article or a substrate with a coating composition as claimed in claim 19.

23. The method according to claim 22, wherein the method further comprises the step of curing the coating composition.

24. An article or a substrate comprising a coating composition as claimed in claim 19.

25. An article or a substrate having coated and cured thereon a coating composition as claimed in claim 19.

* * * * *